United States Patent [19]

Kellogg et al.

[11] Patent Number: 5,572,424

[45] Date of Patent: Nov. 5, 1996

[54] DIAGNOSTIC SYSTEM FOR AN ENGINE EMPLOYING COLLECTION OF EXHAUST GASES

[75] Inventors: Robert L. Kellogg; Kenneth S. Norman, both of Minneapolis; Jeffrey K. Hislop, Blaine, all of Minn.; Sushil L. Pillai, Bombay, Ind.

[73] Assignee: Automotive Information Systems, Roseville, Minn.

[21] Appl. No.: 247,542

[22] Filed: May 23, 1994

[51] Int. Cl.⁶ .................................................. F02B 27/04
[52] U.S. Cl. ...................................................... 364/424.03
[58] Field of Search ............................. 364/424.03, 496; 73/23.31, 863.01, 117, 117.3; 340/439; 356/51

[56] References Cited

U.S. PATENT DOCUMENTS

| | | | |
|---|---|---|---|
| 3,603,155 | 9/1971 | Morris et al. | 73/23.31 |
| 3,938,377 | 2/1976 | Converse, III et al. | 73/117 |
| 3,973,848 | 8/1976 | Jowett et al. | 356/51 |
| 3,998,095 | 12/1976 | Tinkham et al. | 73/117 |
| 5,105,651 | 4/1992 | Gutmann | 73/23.31 |
| 5,177,464 | 1/1993 | Hamburg | 340/439 |
| 5,210,702 | 5/1993 | Bishop et al. | 364/496 |
| 5,218,857 | 6/1993 | Decker et al. | 73/23.31 |

Primary Examiner—Kevin J. Teska
Assistant Examiner—Dan Fiul
Attorney, Agent, or Firm—Merchant, Gould, Smith, Edell, Welter & Schmidt

[57] ABSTRACT

A computer implemented method for providing a diagnosis for automotive engine malfunctions using collected vehicle emissions data. The concentration levels of gases within exhaust emitted from a vehicle engine being determined and compared to a plurality of predetermined concentration level data sets stored in a database to find a matching data set. Each predetermined concentration level data set having corresponding engine diagnosis data for identifying engine malfunction. The engine diagnosis and concentration level data being printed on a testing diagnosis form to be filled out by mechanics upon repair of the malfunctioning engine. Upon return of a previously tested vehicle that has been repaired, the same test is performed on the vehicle and the newly collected concentration level data is compared with the prior failing concentration level data to determine the accuracy of the repair performed. The database within the computer is updated with a new diagnosis and concentration level data set when the repair performed is different than that recommended by the diagnosis or when the new concentration level data set generated is not found within the database. This provides the closed loop learning system in which new failure concentration level data sets and an associated diagnosis are stored for addition to the database.

15 Claims, 41 Drawing Sheets

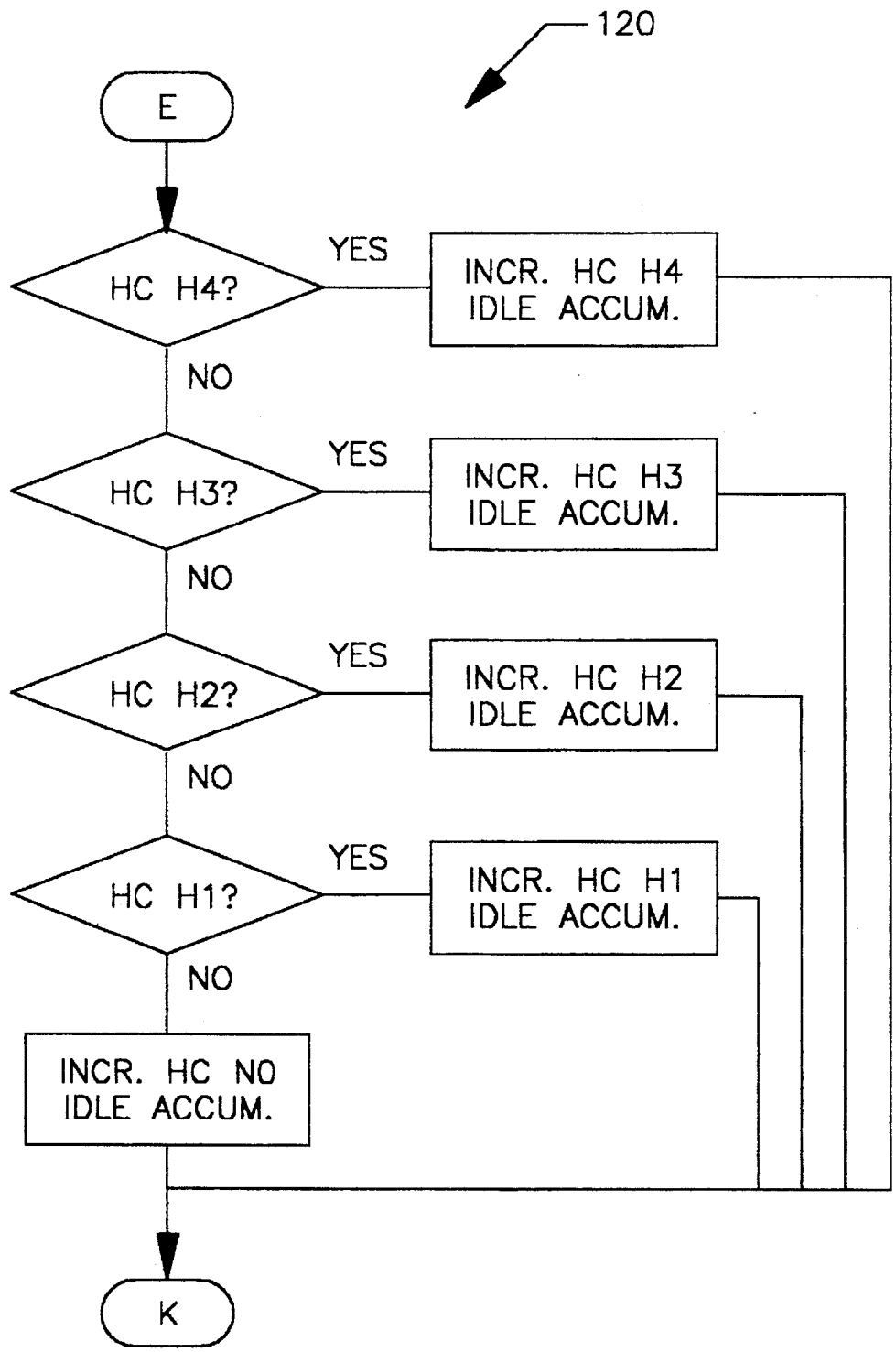
FIG. 14C.1

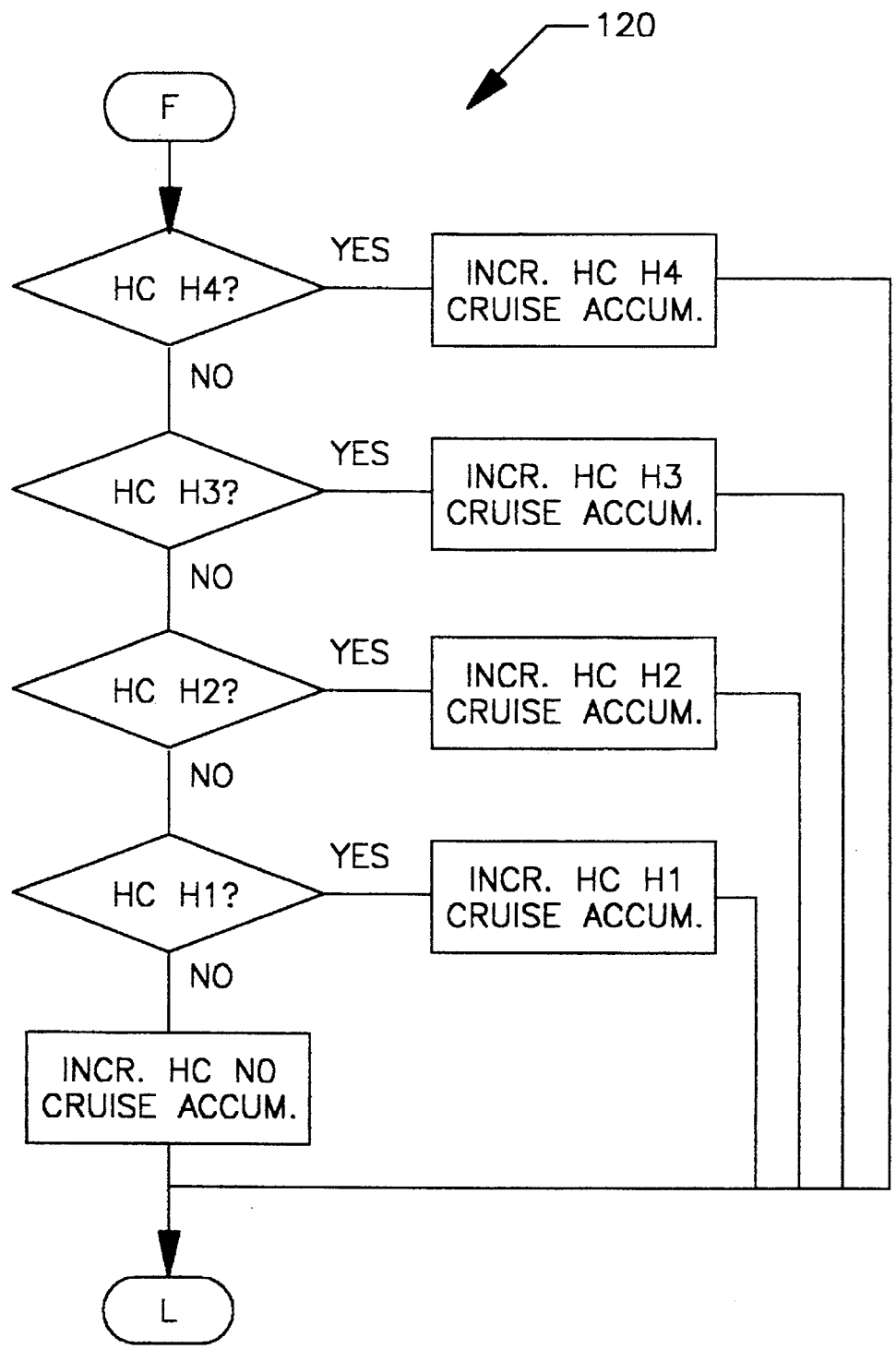
FIG. 14C.2

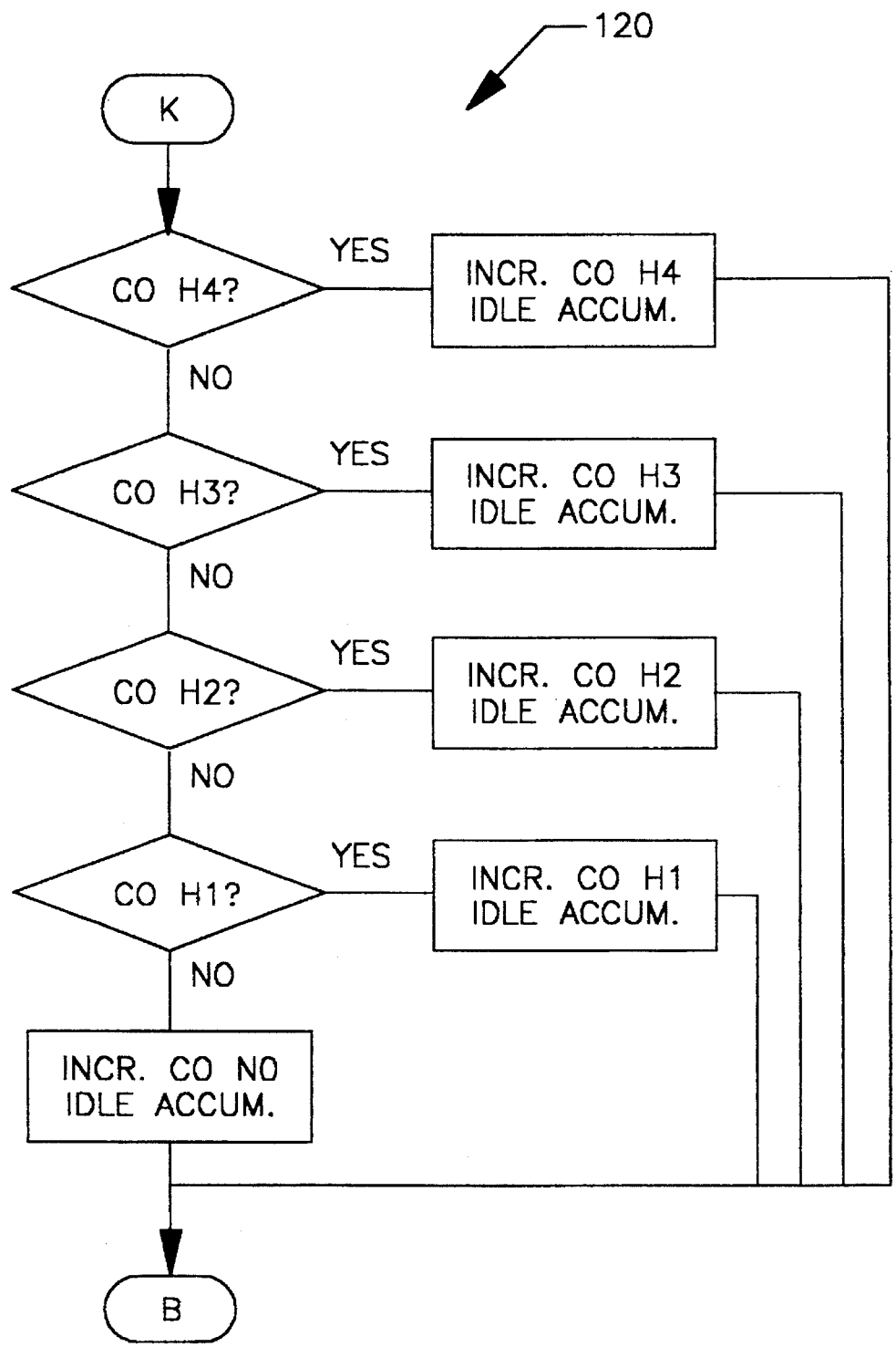
FIG. 14C.3

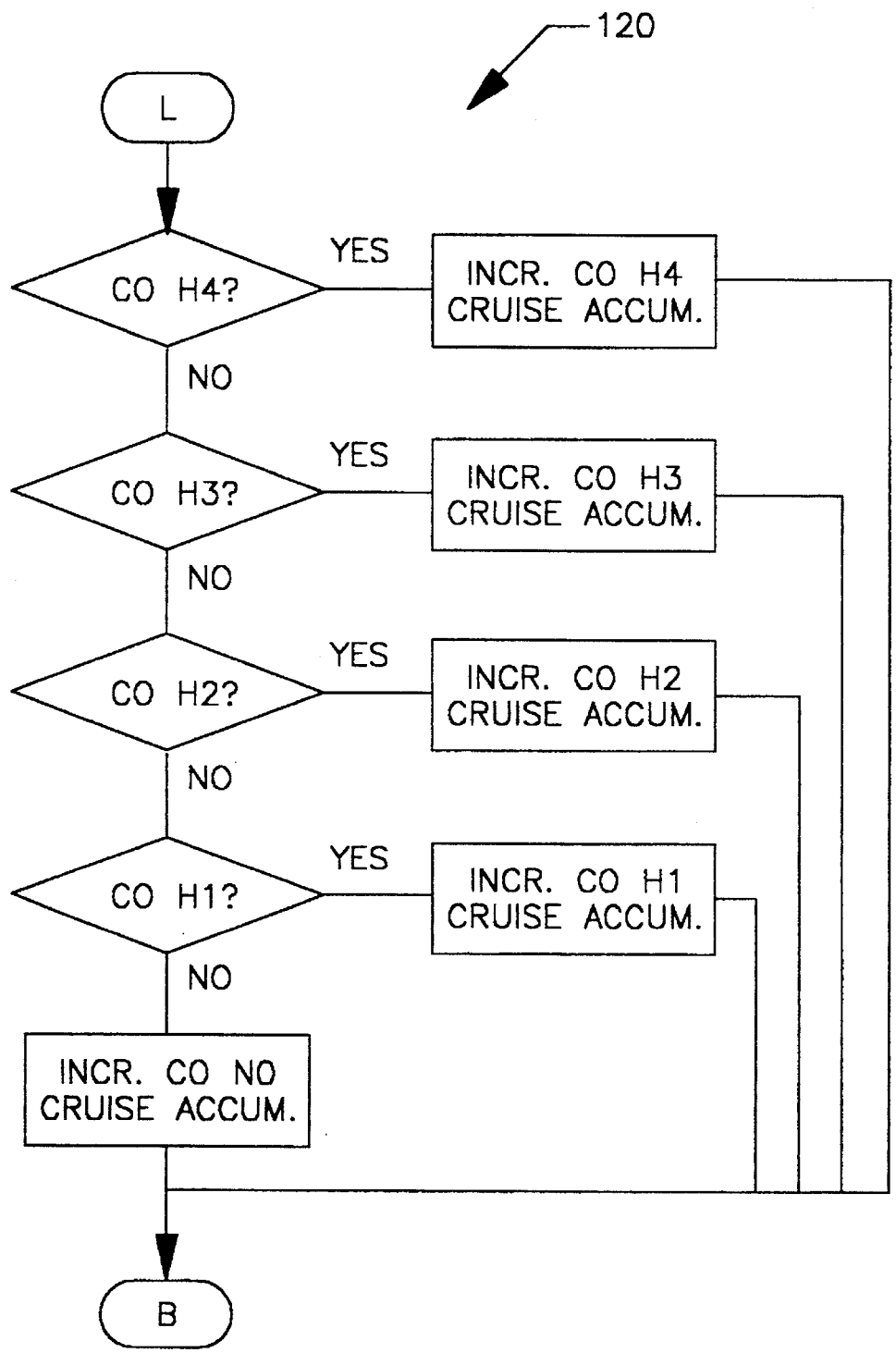
FIG. 14C.4

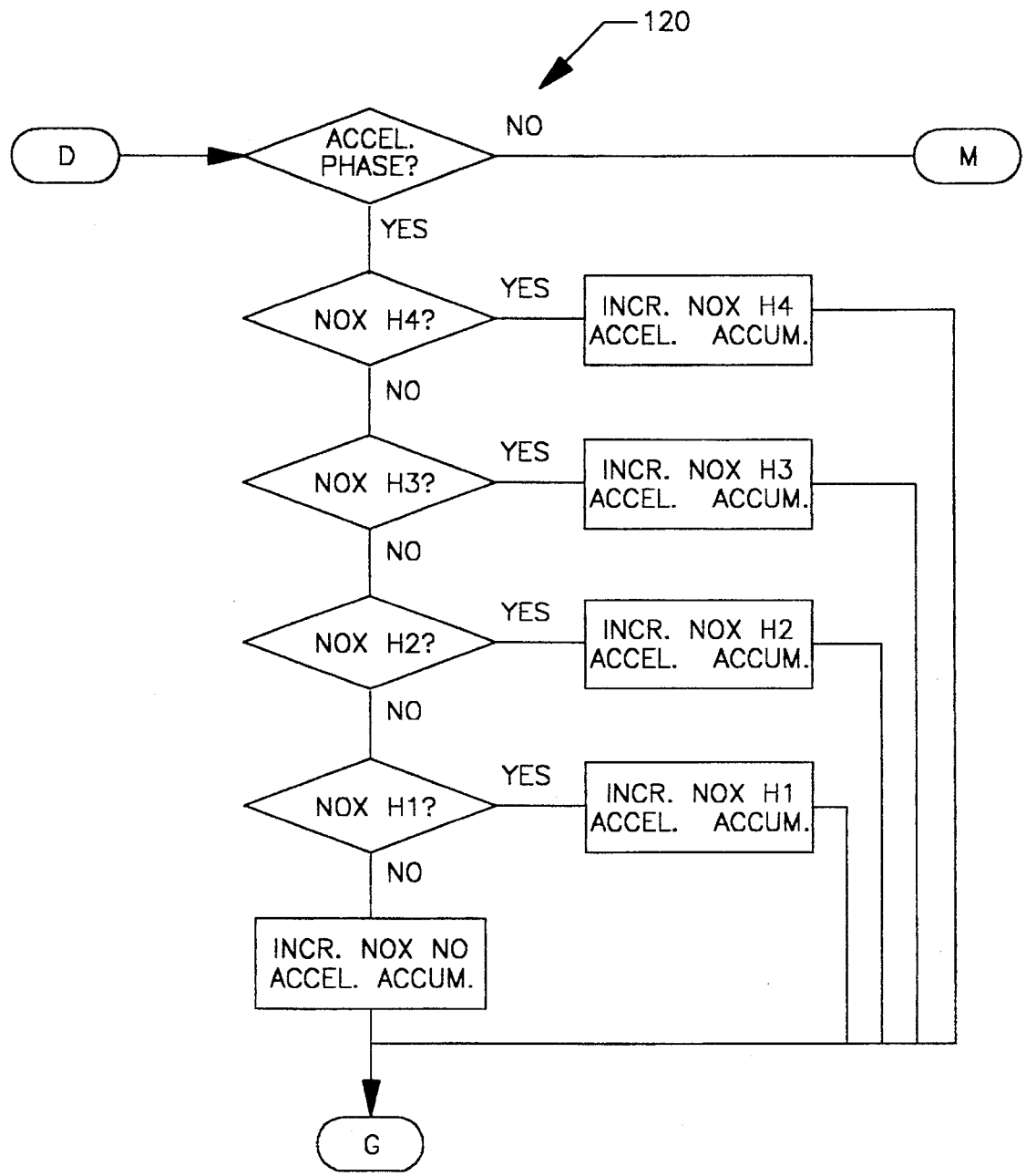
FIG. 14D.1

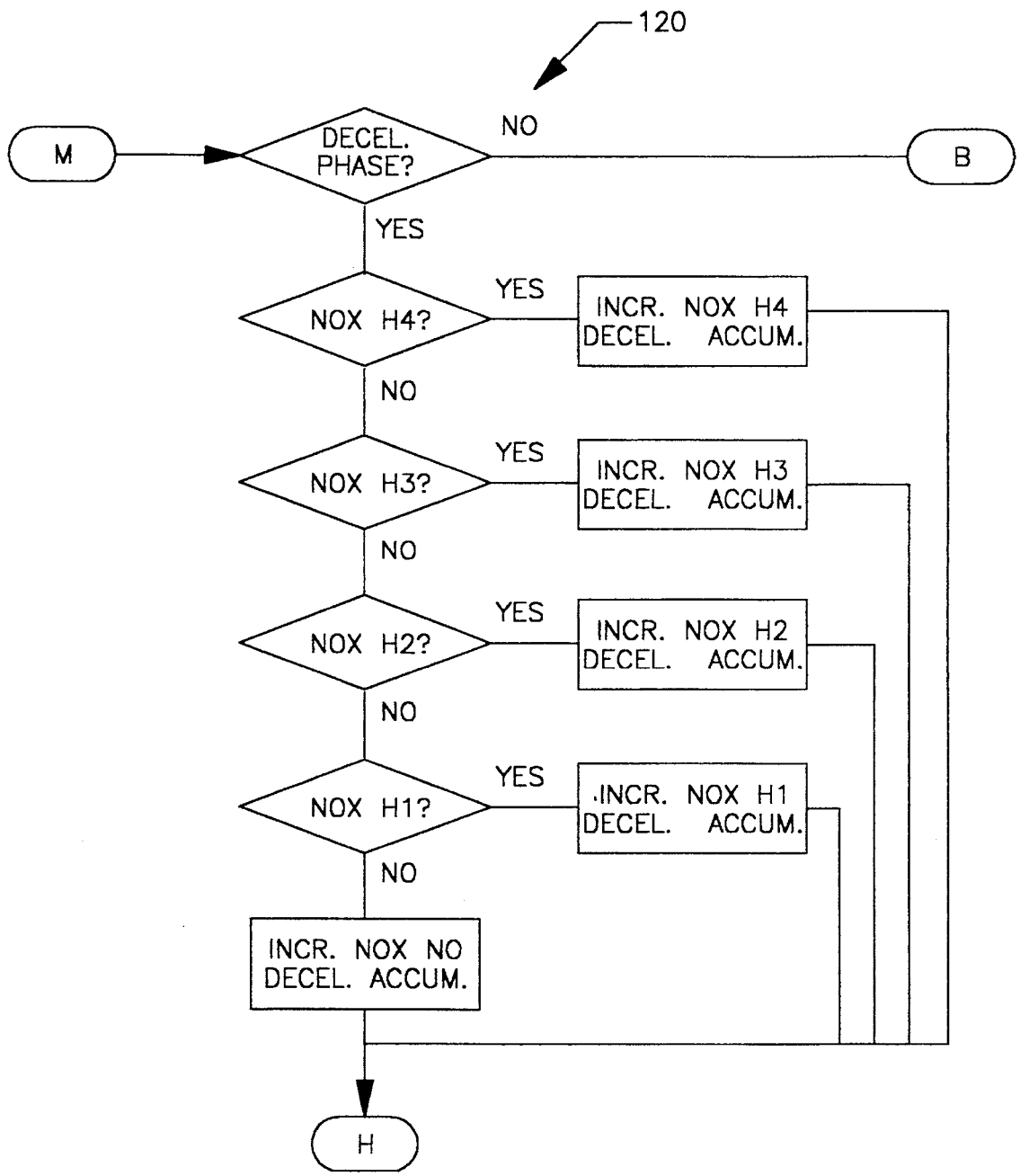
FIG. 14D.2

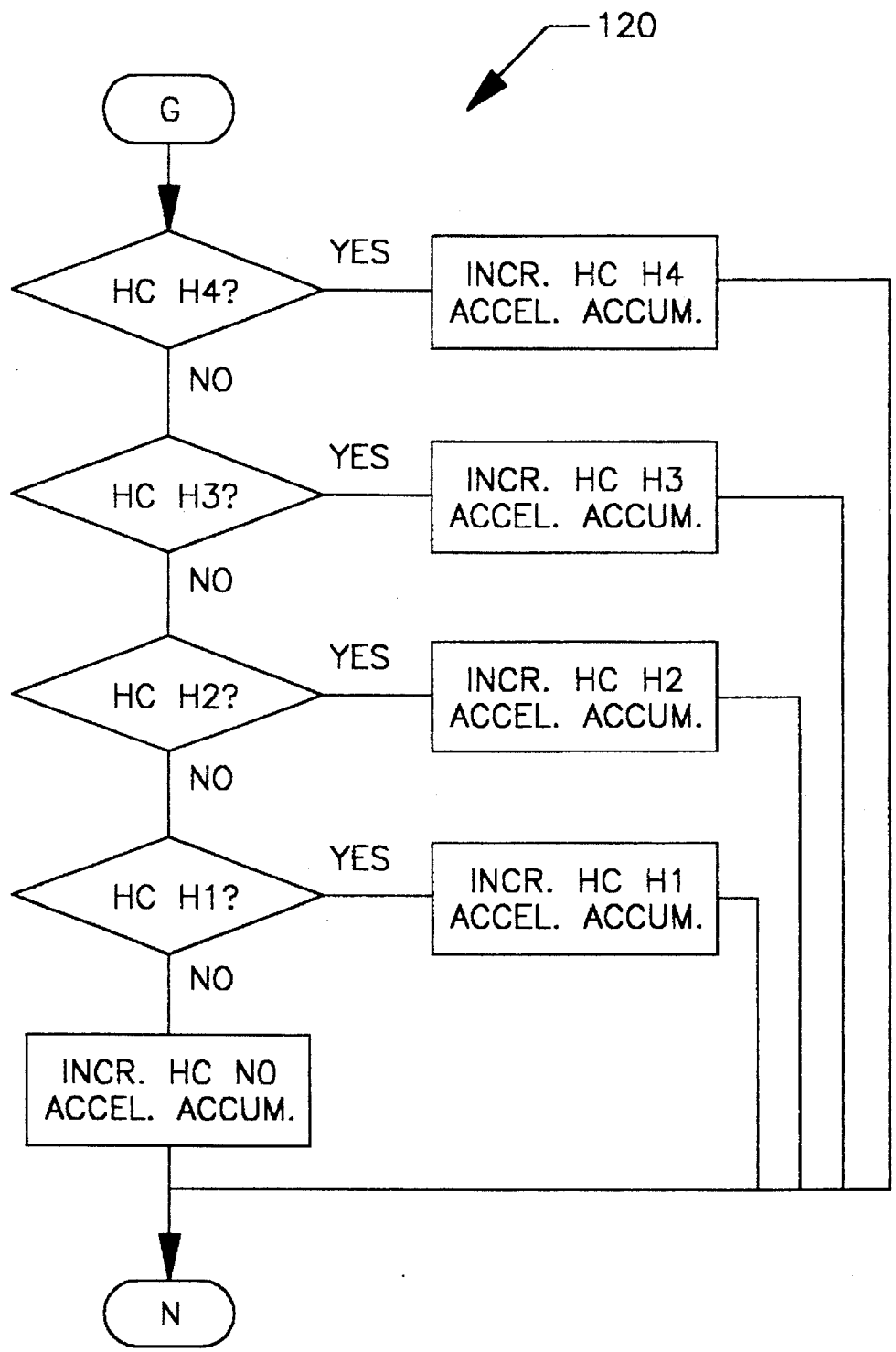
FIG. 14E.1

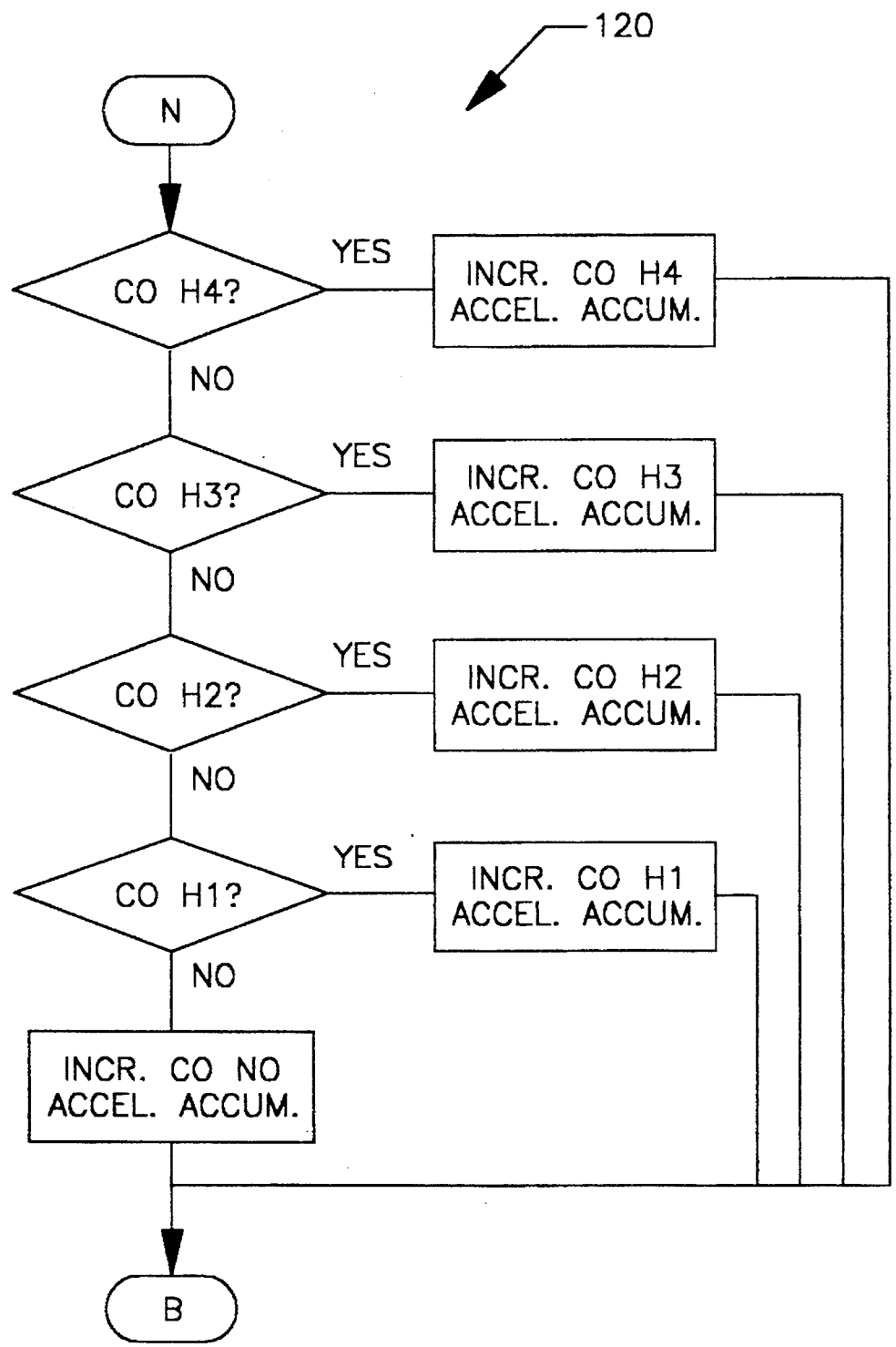
FIG. 14E.2

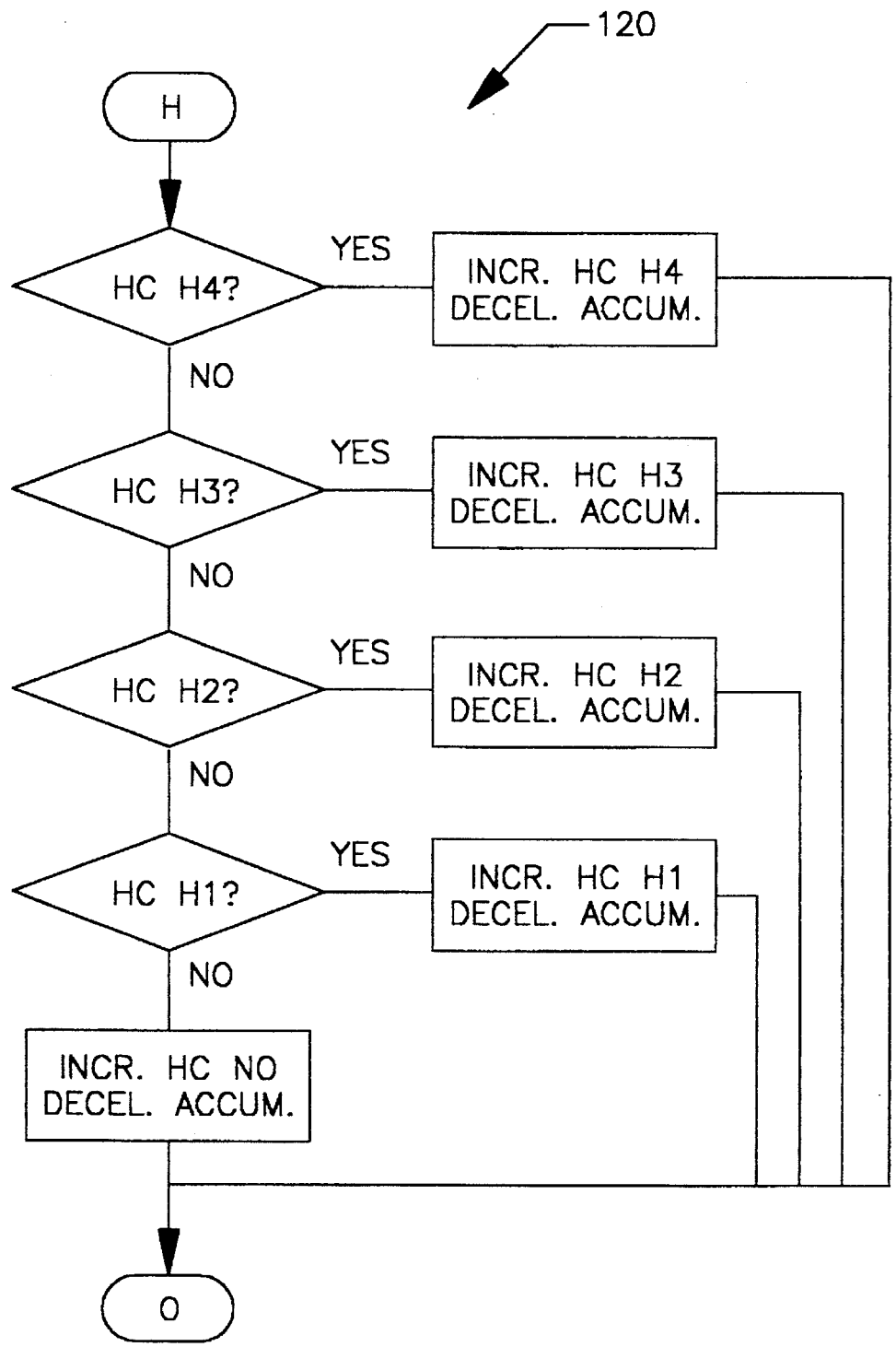
FIG. 14E.3

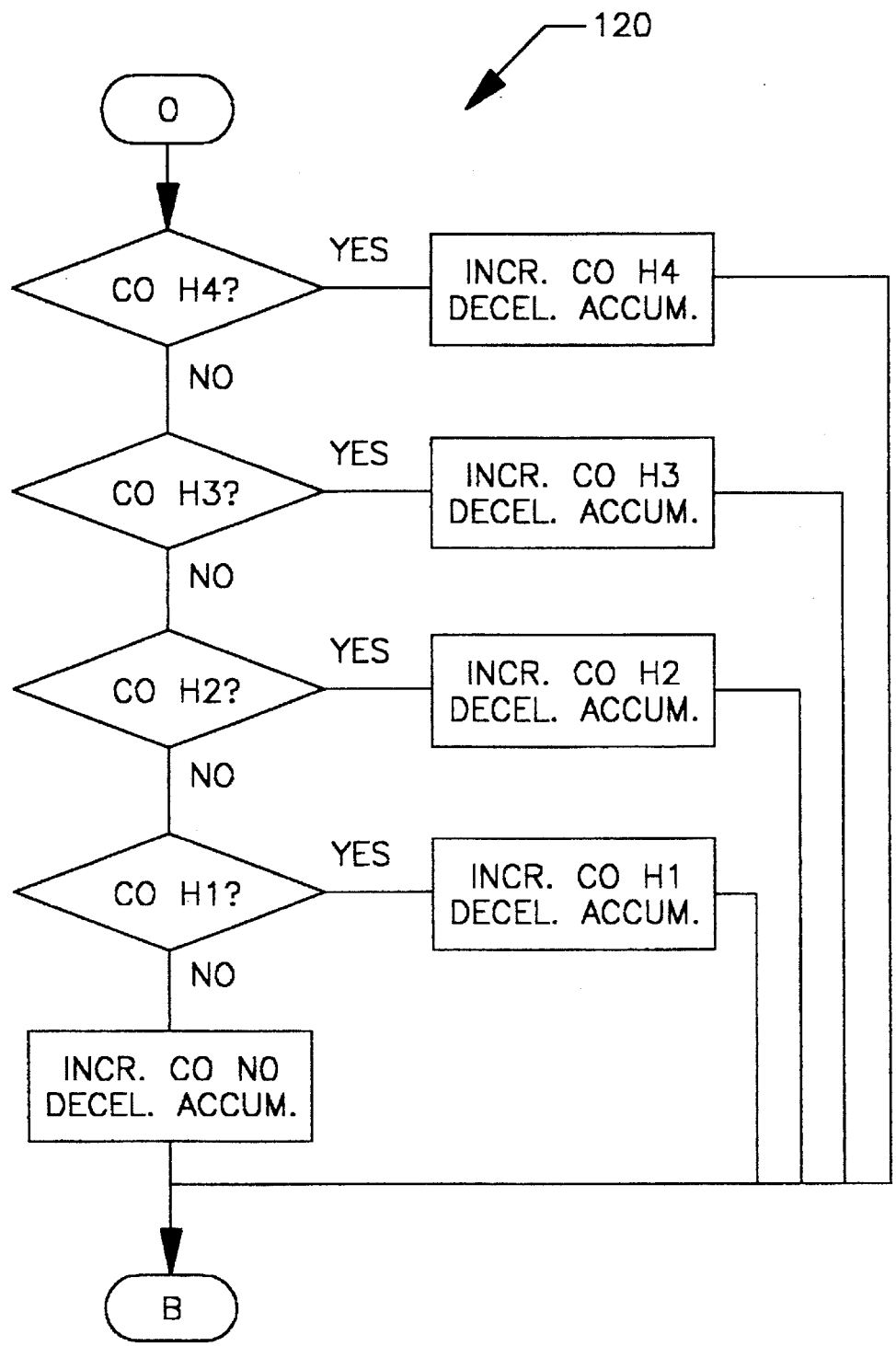
FIG. 14E.4

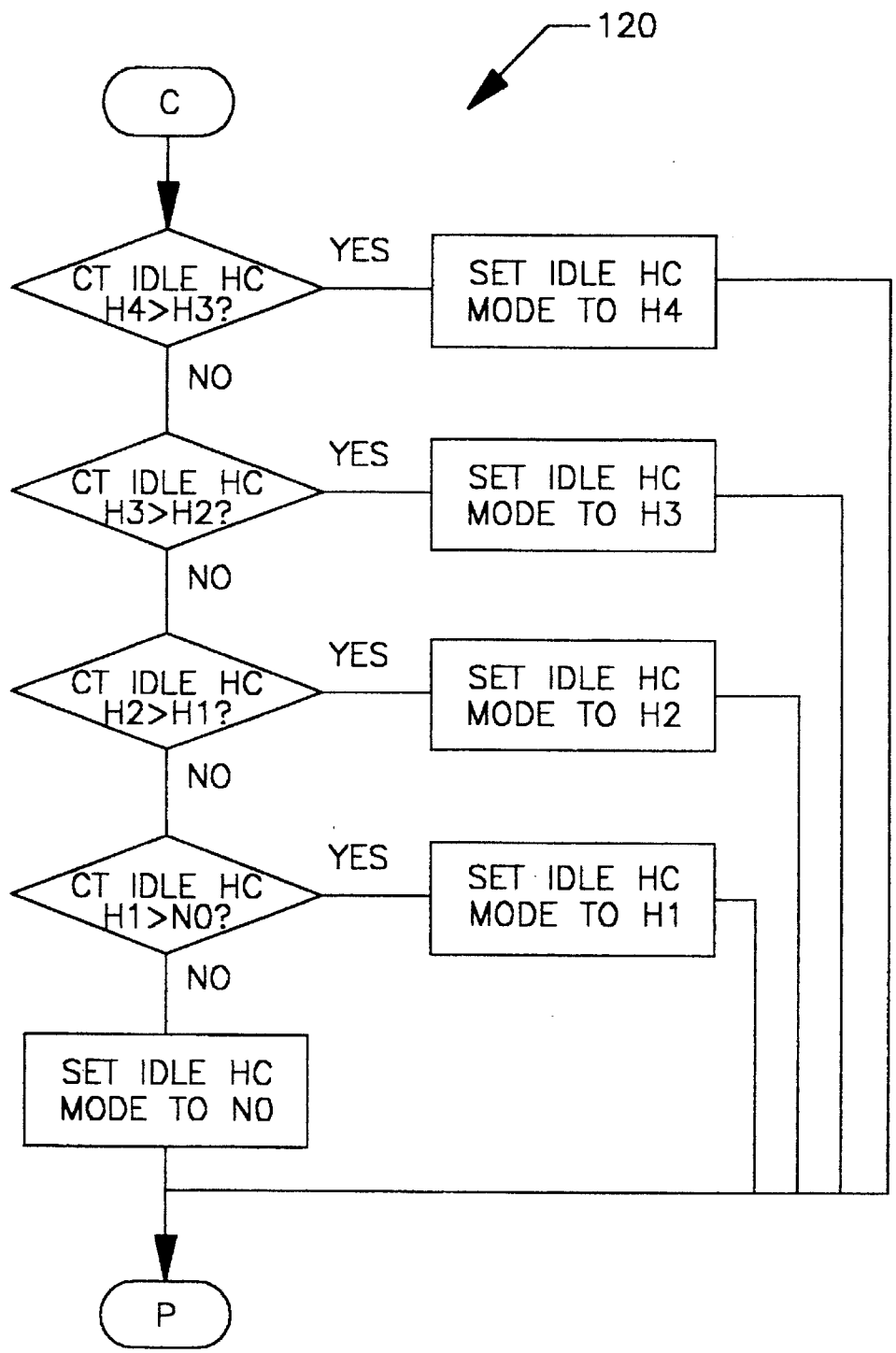
FIG. 14F.1

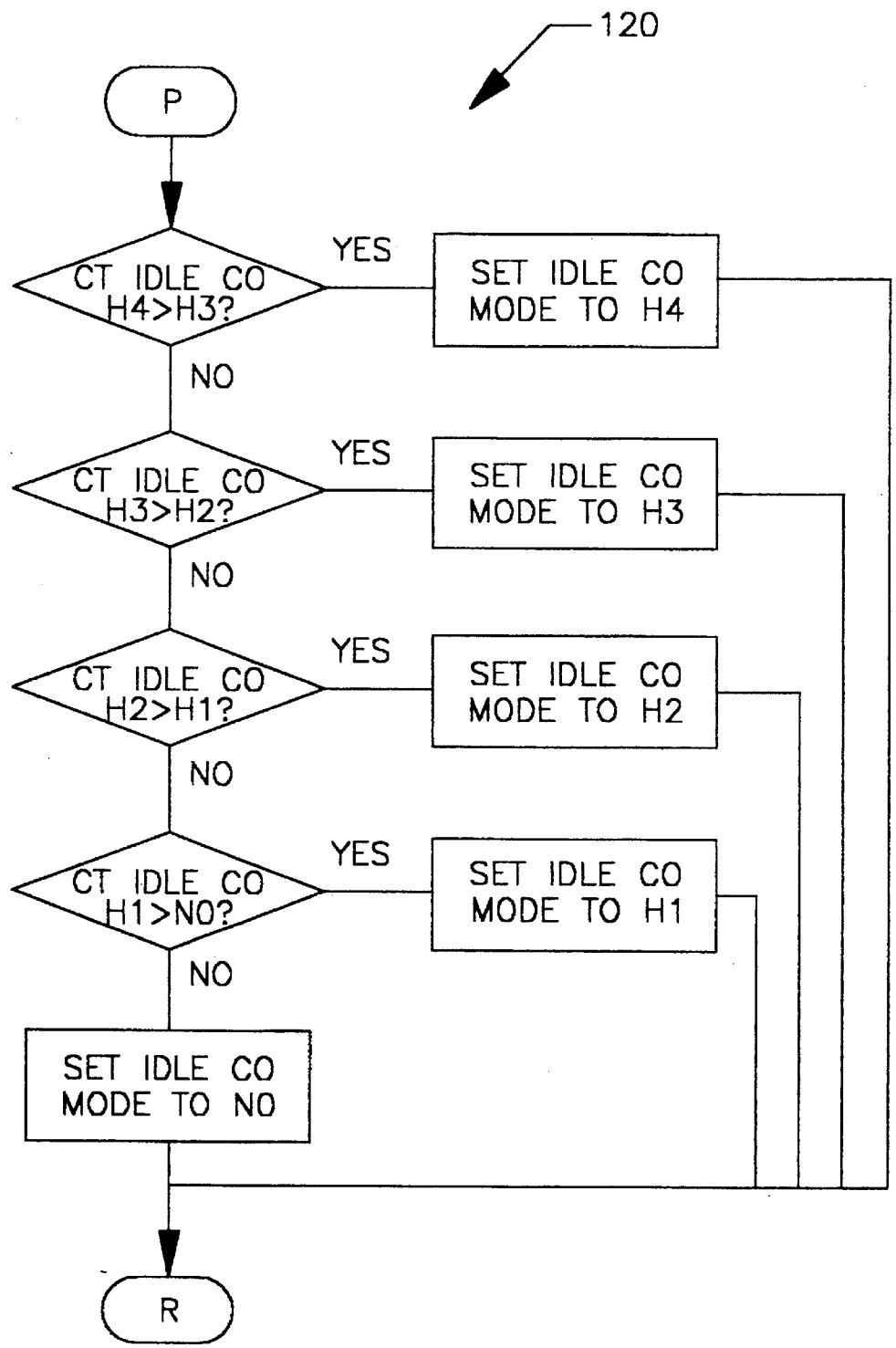
FIG. 14F.2

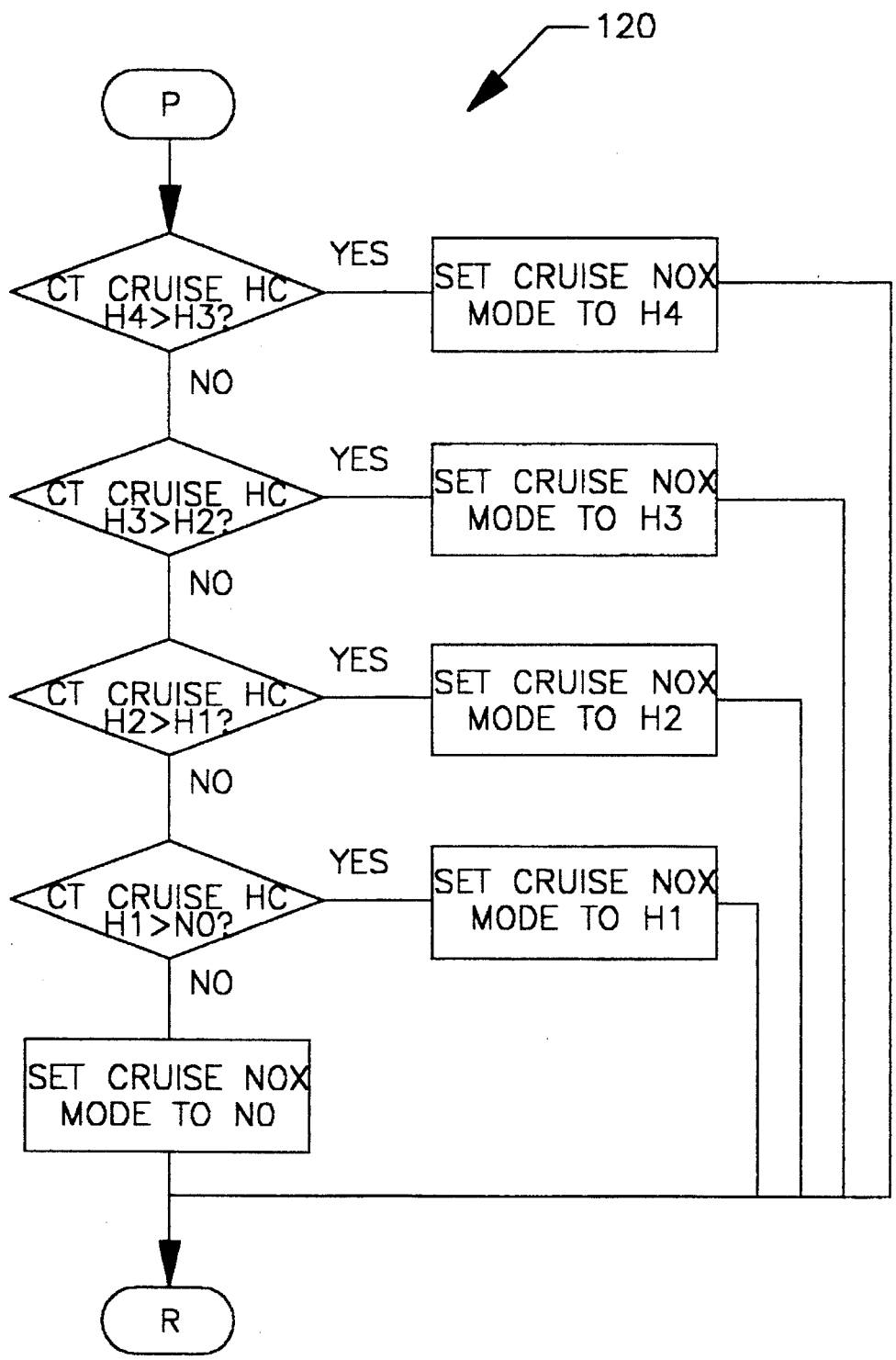
FIG. 14F.3

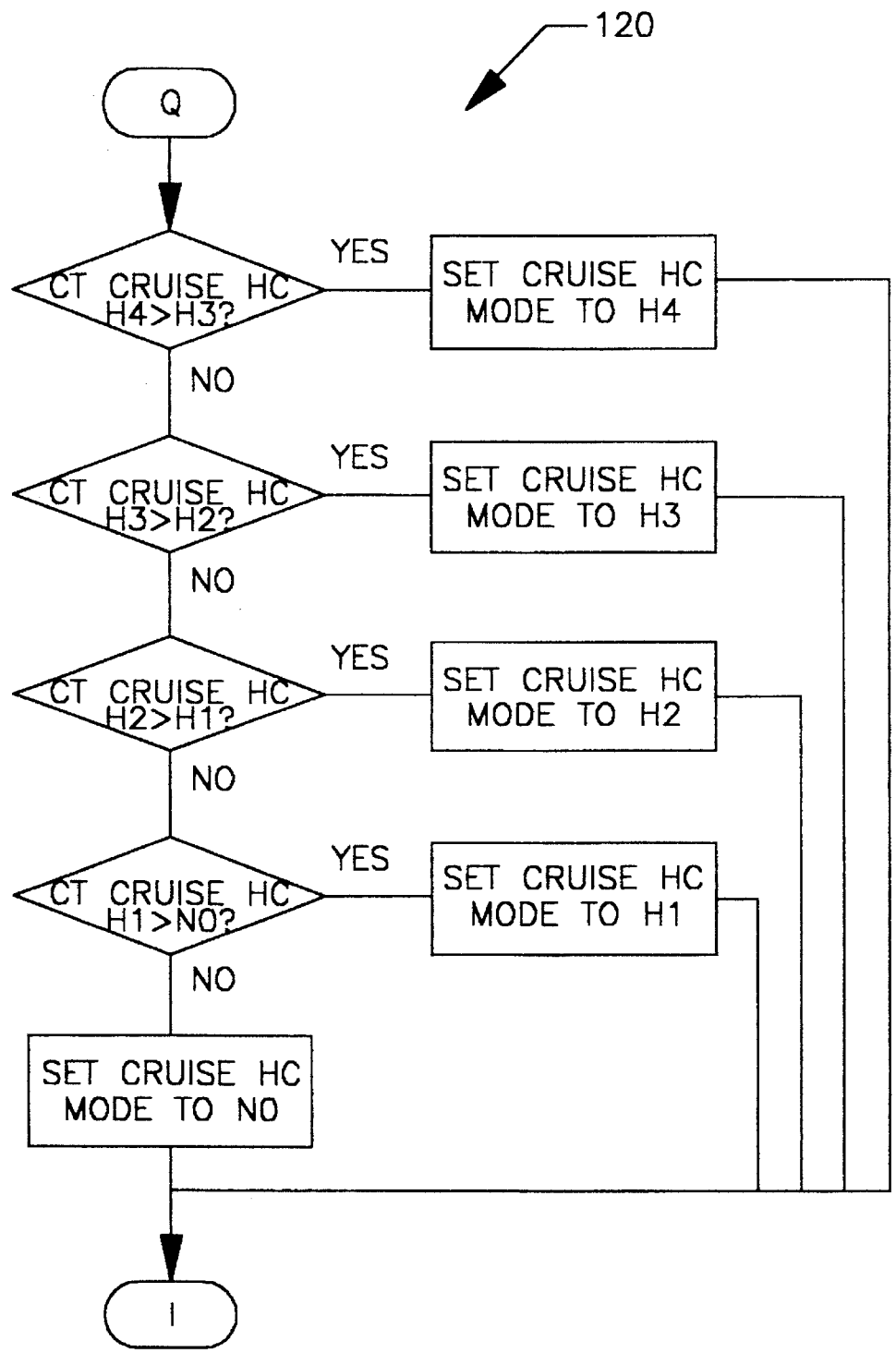
FIG. 14F.4

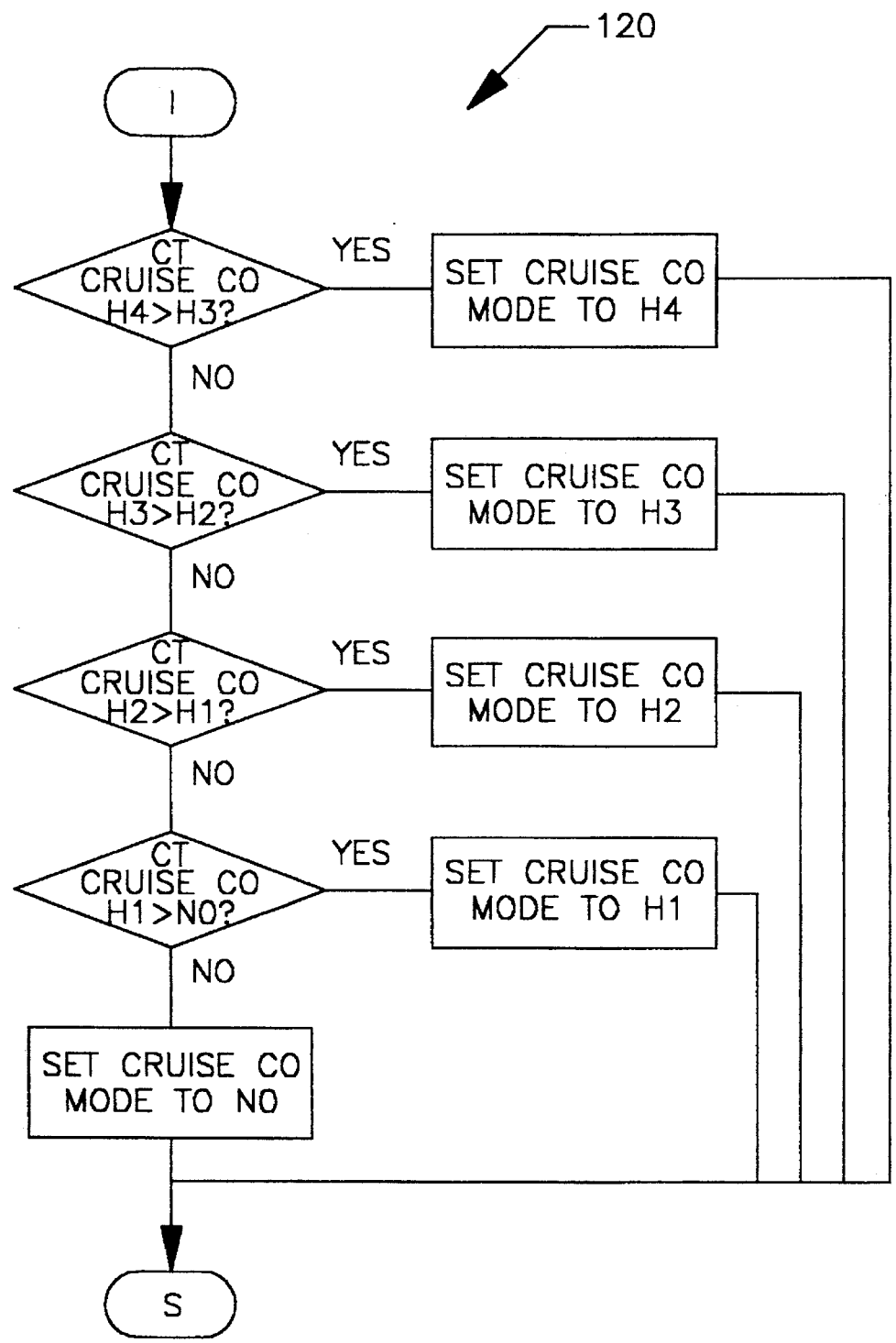
FIG. 14G.1

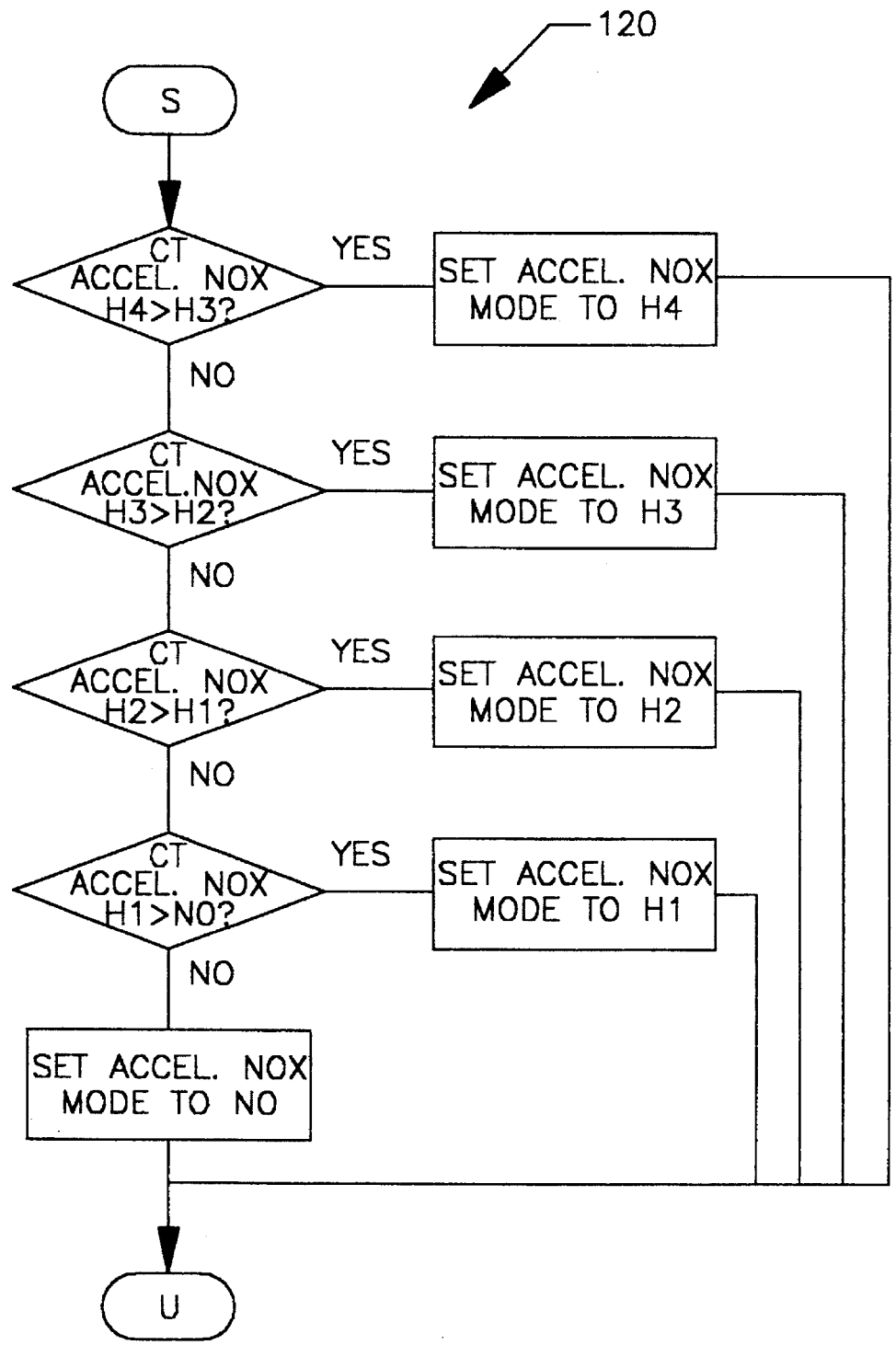
FIG. 14G.2

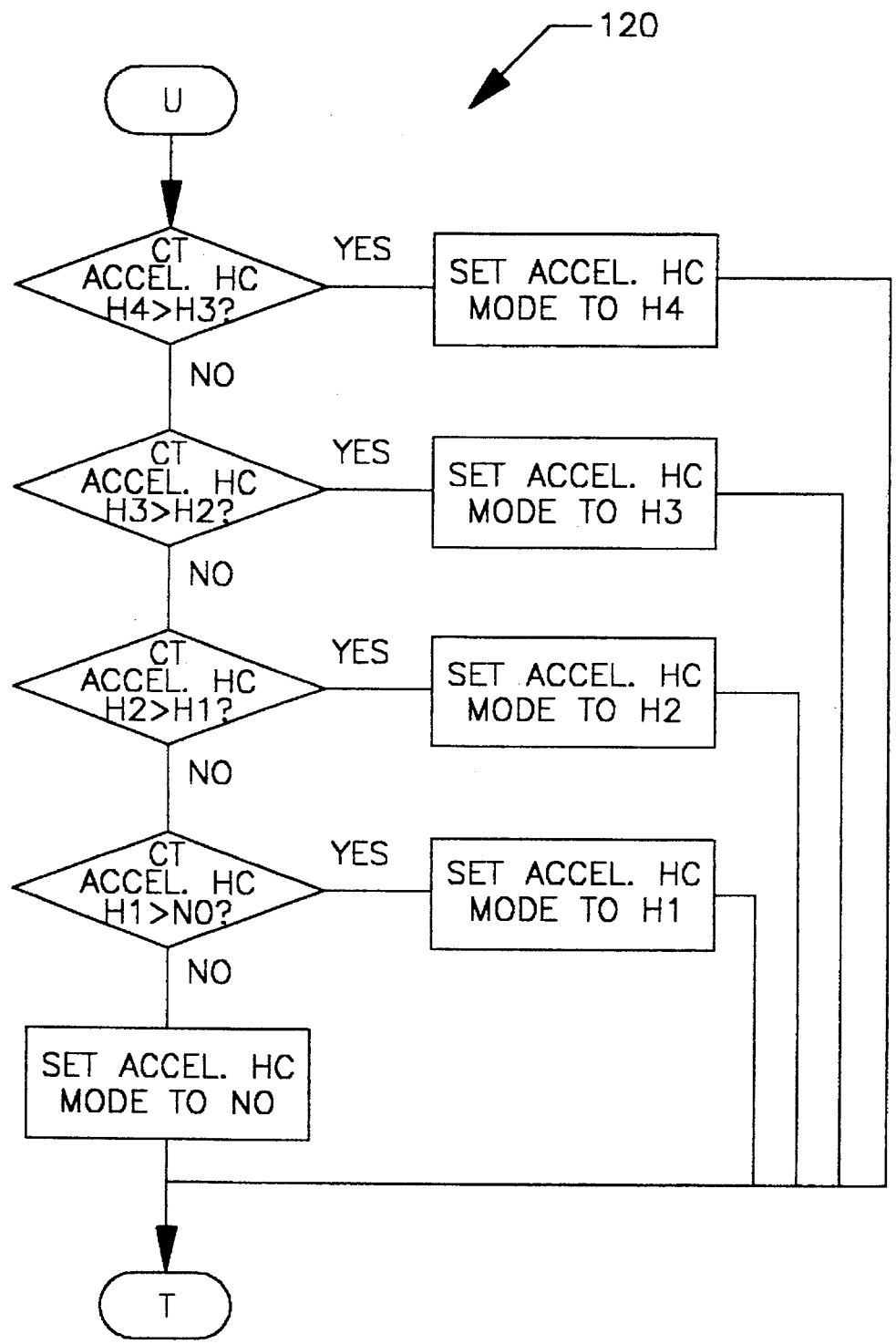
FIG. 14G.3

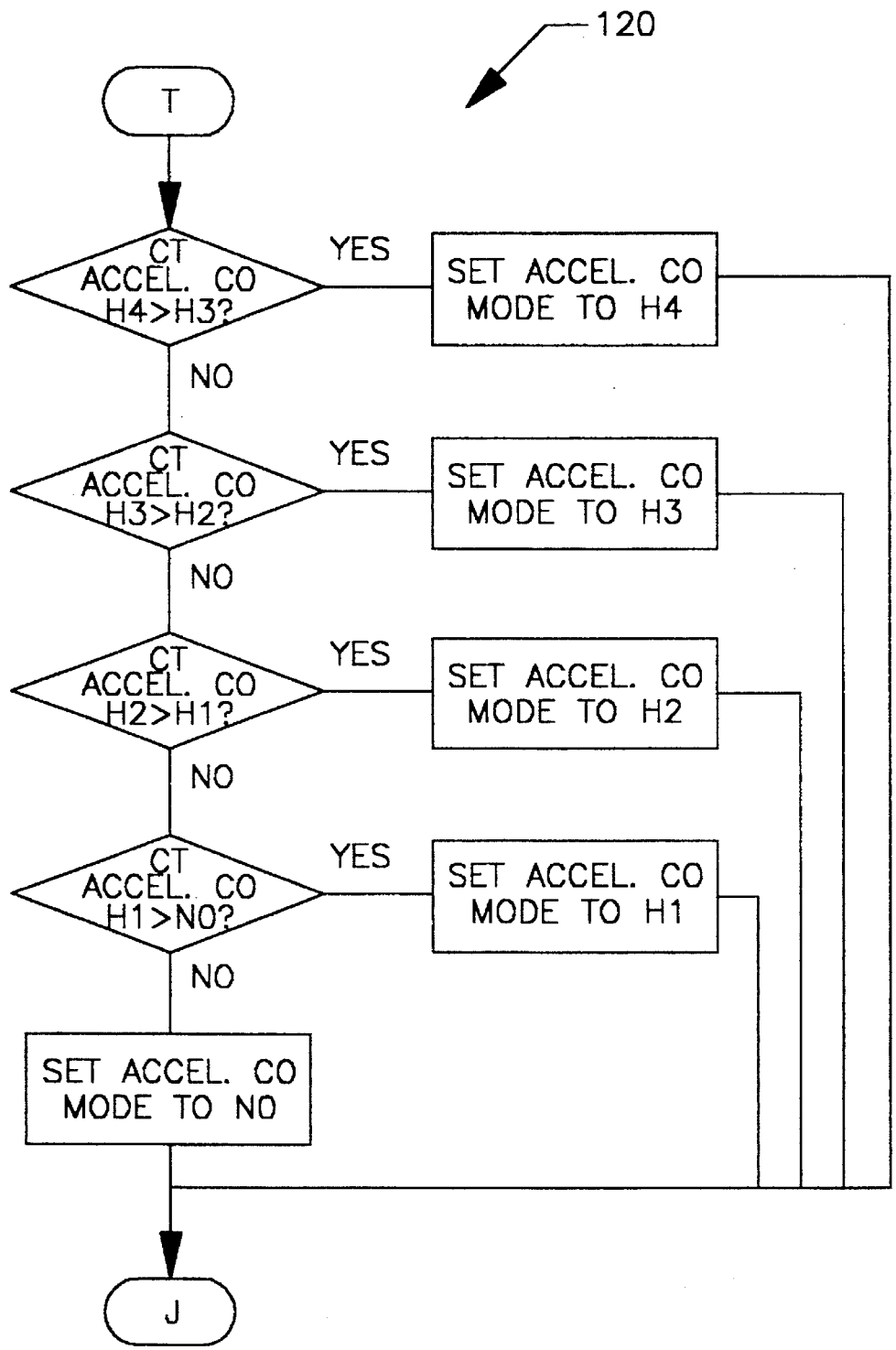
FIG. 14G.4

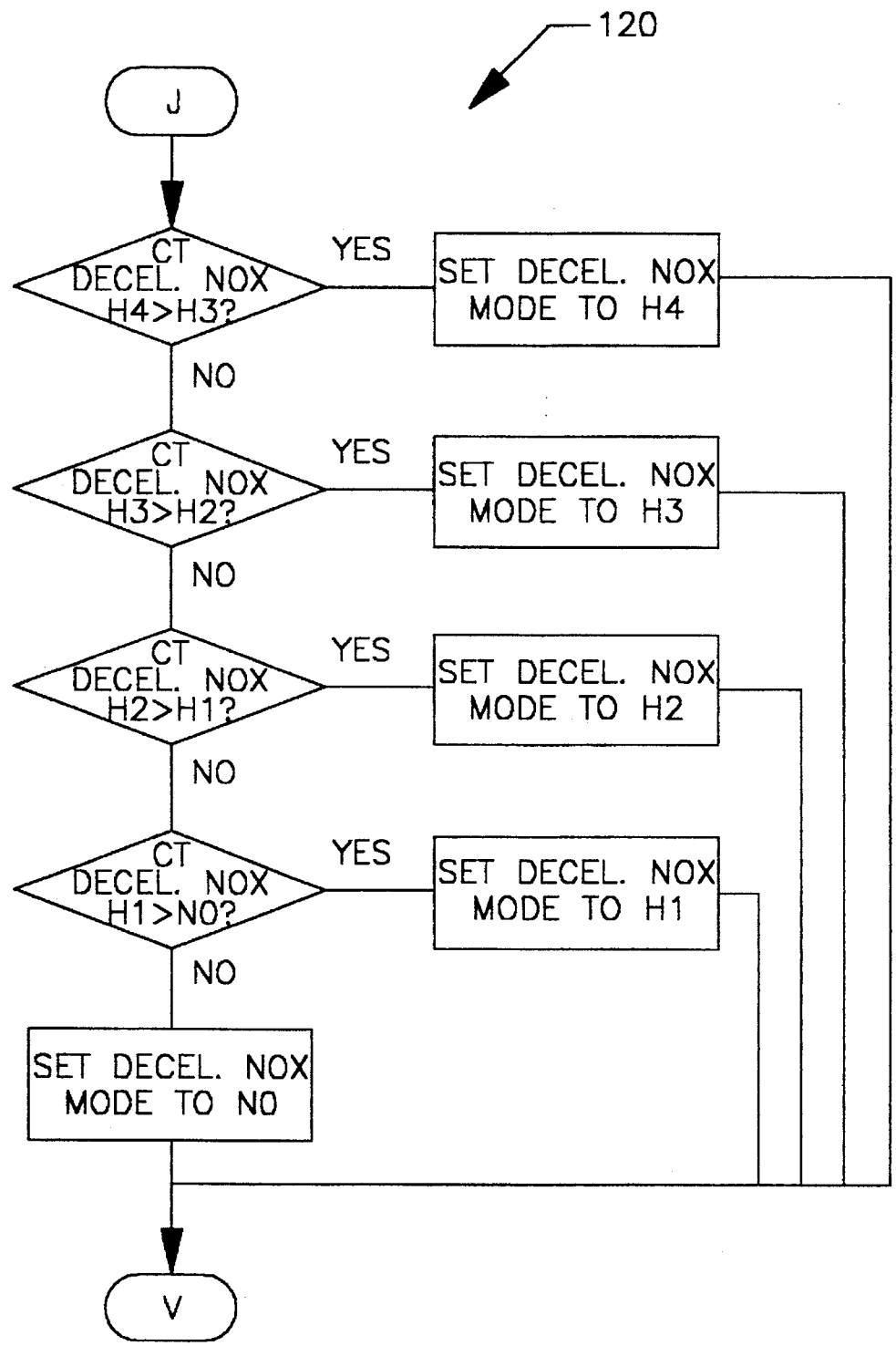
FIG. 14H.1

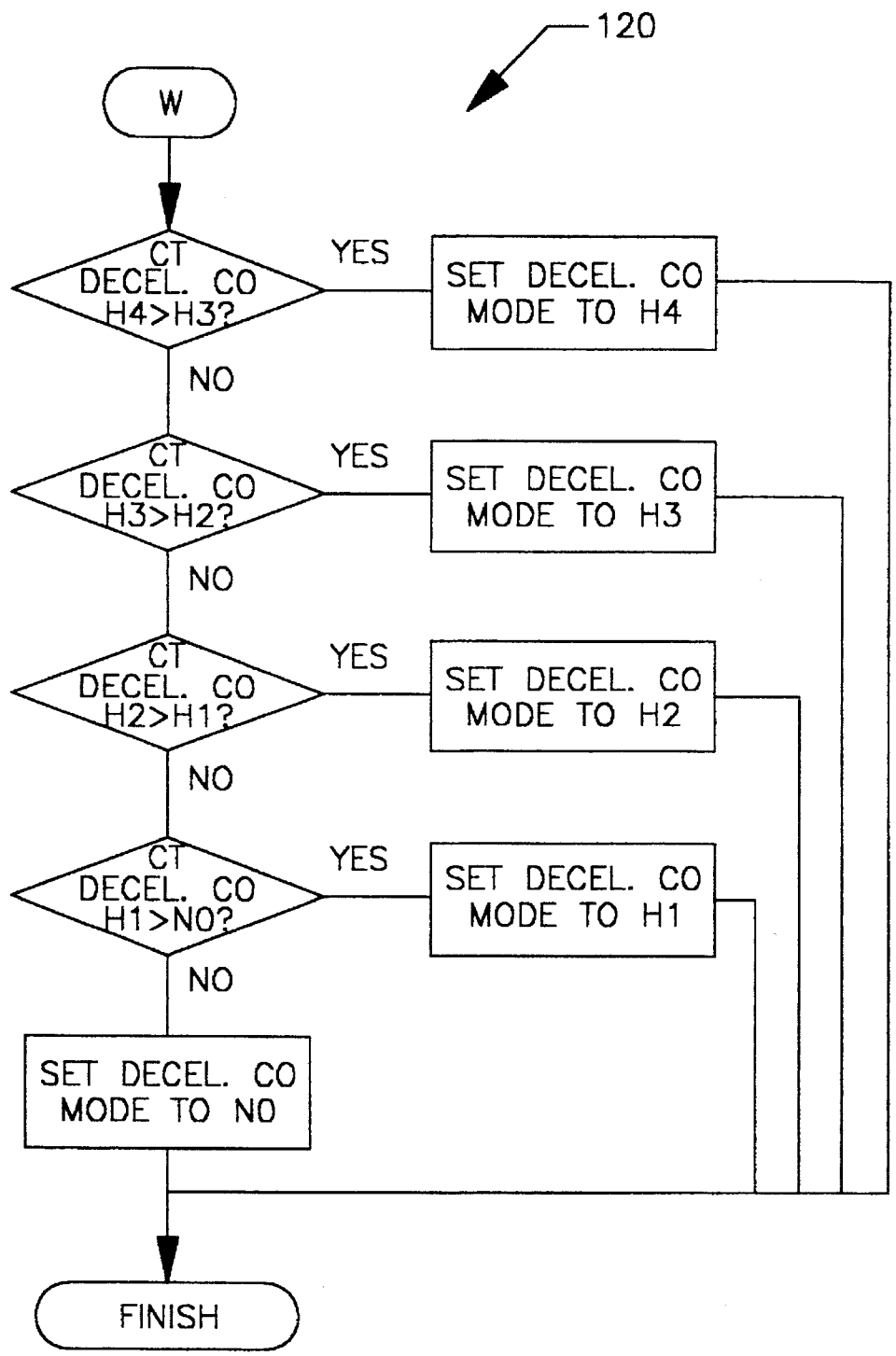
FIG. 14H.2

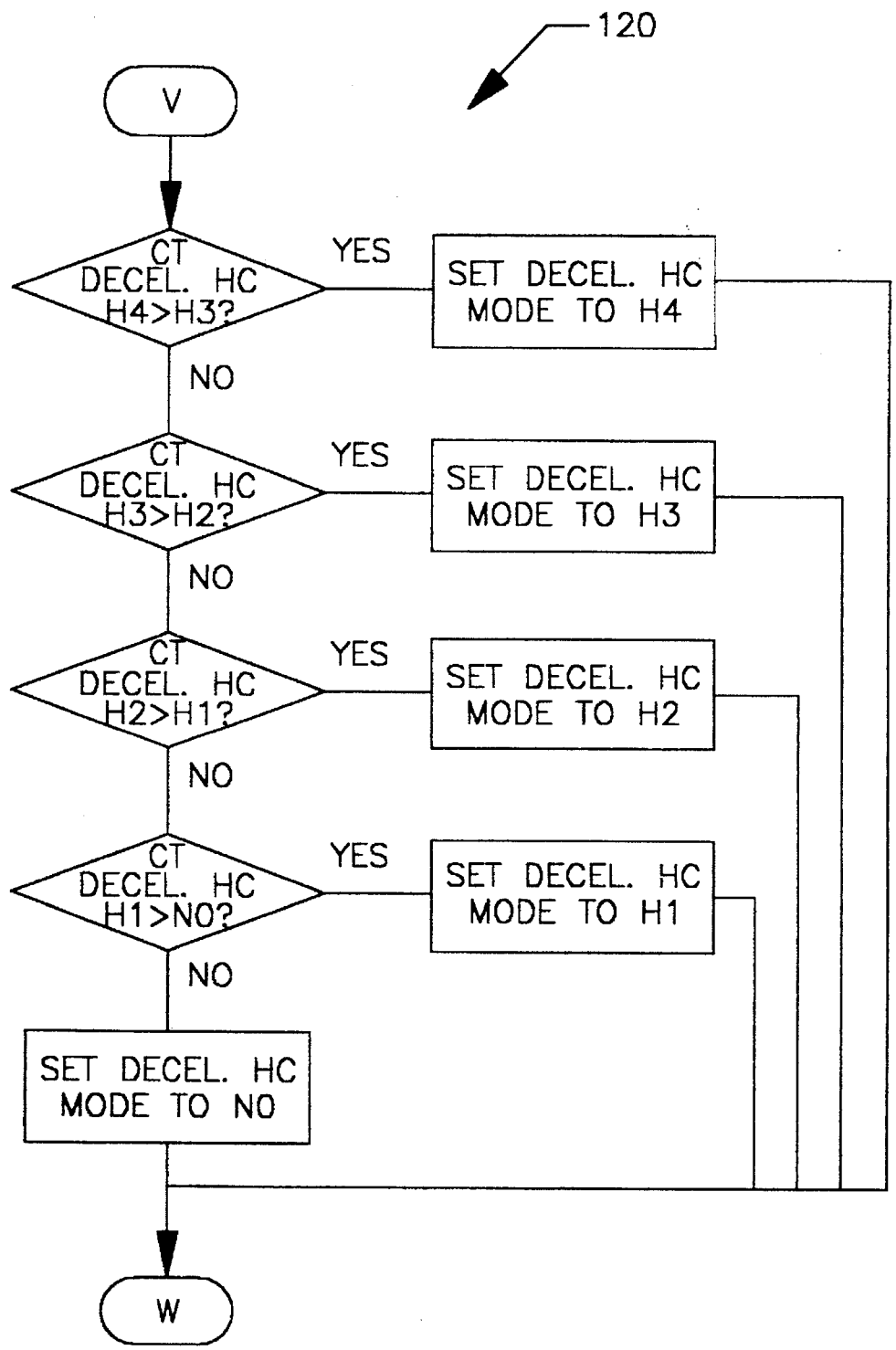
FIG. 14H.3

DIAGNOSTIC SYSTEM FOR AN ENGINE EMPLOYING COLLECTION OF EXHAUST GASES

TECHNICAL FIELD OF THE INVENTION

The present invention pertains generally to vehicle emission analysis and more particularly to a computer implemented apparatus and method for analyzing vehicle emissions and diagnosing the problems associated with engine malfunction.

BACKGROUND OF THE INVENTION

It is well known that the exhaust gas from motor vehicles is considered a prime cause of air pollution. Accordingly, considerable activity has been and is now being directed to establishing prescribed standards of permissible emission levels of CO, HC, $NO_x$, and $CO_2$, and to methods and apparatus for evaluating the emissions to determine whether they fall within acceptable concentration ranges.

Among these activities, the Federal authorities have promulgated driving cycle tests for determining the presence of contaminants in engine exhaust emissions. Such tests are typical of urban driving by average motorists and are satisfactory for certification of new engines or engines in new vehicles. In the past, such tests required a great deal of time and were too complicated for mass vehicle inspection. This prompted the Federal Government to design and develop the IM240 emissions test. Which allows for emissions tests to be performed with minimum operator skill and experience. However, the IM240 test, and all other tests previously developed by the Federal Government are not designed to produce data from which the cause of the malfunction of the engine can be readily ascertained.

In light of heightened environmental awareness, it is anticipated that emission testing standards will be raised, causing an increase in the number of vehicles that fail such tests. Existing repair facilities will be grossly inadequate to handle such increases with the present hypothesis approach to pinpointing the cause of such failures. What is needed, in order to enable the necessary repairs to be made for any given vehicle found to have emission-related engine malfunction, is a quick method and simple means for evaluating the contaminants in the engine emissions to thereby provide an accurate diagnoses of the existing engine malfunction that is causing excessive contaminants. The diagnosis would inform the repairman or mechanic what the problem is so that malfunction could be corrected by proper adjustment or repair.

U.S. Pat. No. 3,998,095 for Method and Apparatus for Quickly Evaluating Engine Exhaust Gas Emissions, provides a system that provides engine malfunction diagnosis. However, the diagnosis opinion rendered does not have the level of detail that will be required in the future when emission testing standards are raised. Higher test standards, such as the EPA mandated IM240 emissions test will catch many engine malfunctions that go undetected by current emissions tests. There is a need for a system that utilizes the EPA mandated IM240 emissions test, which U.S. Pat. No. 3,998,095 specifically states that it does not use. This reference utilizes electronic logic circuits to represent truth charts to select a limited set (6 possible solution report sheets) of simplistic canned diagnosis for the myriad of possible engine malfunctions. Thus the drawback of such a system is that instead of accurate diagnoses of problems and specific solutions to problems, only generalized diagnosis of problem areas are provided.

For example if an engine failed an emission test as a result of abnormally high hydrocarbons, although the vehicle owner and test facilitator could be made aware of this fact, they could not be made aware of the cause of the problem (e.g., a plugged air filter, a need for spark plugs replacement, or simply use of bad gasoline). Therefore, it will be appreciated that the opinion provided by the system disclosed in U.S. Pat. No. 3,998,095 is simplistic and generic as to why the engine failed the emissions test. The opinion is only of use to the mechanic who needs minimal direction as to what needs to be repaired or checked. In addition, it fails to give a specific opinion as to what problems the engine had.

One major problem associated with this type of generic emission testing opinion, is that all vehicle owners who are not do-it-yourself mechanics remain uninformed as to what repairs specifically need to be performed on their vehicles in order to pass an emissions test. There is a need for an emission test opinion that informs the public as to what repairs specifically need to be performed, so that they can prevent unwarranted repairs.

In addition there is a need for a system that provides a closed loop on trouble-shooting engine problems and what fixes them. Such a system would be capable of learning over time and improving itself so that the system could provide more accurate diagnoses. It would be of great benefit to society and the automotive industry if there was a database that stored engine failure readings, the diagnosis for the problem, and the repaired engine readings along with what repairs were performed on the engine. Such a system could provide a means for monitoring automotive repairs. The information provided by the system would also allow the automotive industry to better understand what causes engine problems and how to fix them.

Another limitation to current emission testing, is that tests which are detailed enough to provide sufficient data for accurate pass/fail determinations and diagnosis are too time consuming. Typically, vehicles entering an emission testing station go through a schedule that captures a set of readings for that vehicle. Depending on the complexity of the analysis, there will be a considerable number of data points. Although it may not take significant time to determine whether the system fails the emission test, the diagnosis performed on those data points to determine what the problem is can take considerable time. Therefore, there is a need for a system which can perform a diagnosis on this data while adding negligible time to the emission testing process. The present invention addresses these draw backs.

SUMMARY

To address the drawbacks of existing emission testing systems, and provide other advantageous benefits and functions, the present invention provides a computer implemented method for analyzing and diagnosing vehicle emission testing data. Following analysis the diagnosis can be performed with negligible time being added to the testing process. Additionally, the present invention provides an emission testing data diagnostic system for tracking, processing and storing problems associated with engines and what repairs were performed to repair them.

Therefore according to one aspect of the invention, there is provided a computer implemented method for providing a diagnosis for automotive engine malfunctions using collected vehicle emissions data, comprising the steps of;

generating a concentration level subset for each individual gas of a group of gases within said vehicle emissions data collected, forming a plurality of concentration level subsets; comparing each of said concentration level subsets with predetermined normative concentration break point values to determine a relative correspondence between each of said concentration level subsets and said normative break point values; and comparing said relative correspondence with a plurality of predetermined relative correspondence data readings for finding a match, wherein each said predetermined relative correspondence data reading is associated with a failure signature code, whereby said failures signature code is used to diagnose said engine malfunctions. The computer implemented method further having a method of refining the diagnosis provided to a vehicle owner for use in repairing the malfunctions detected during the emissions test comprising the steps of; reperforming the emissions test following repair of the engine malfunction for determining whether retested engine emissions collected are within an acceptable concentration range; comparing the first test vehicle emissions and the retested vehicle emissions for determining the efficacy of said repair performed; updating the database within the computer with new diagnoses when the repair performed is different from that recommended and provides improved engine emissions; and updating the database with new relative correspondence readings that are not found within plurality of relative correspondence readings. This provides a closed loop learning system in which new relative correspondence readings associated with an engine failure and associated diagnoses can be added to the system when encountered.

BRIEF DESCRIPTION OF THE DRAWINGS

FIGS. 14a–14h illustrate the supplemental processing algorithm of the inference engine for the present invention.

GENERAL DESCRIPTION

Figure 1:
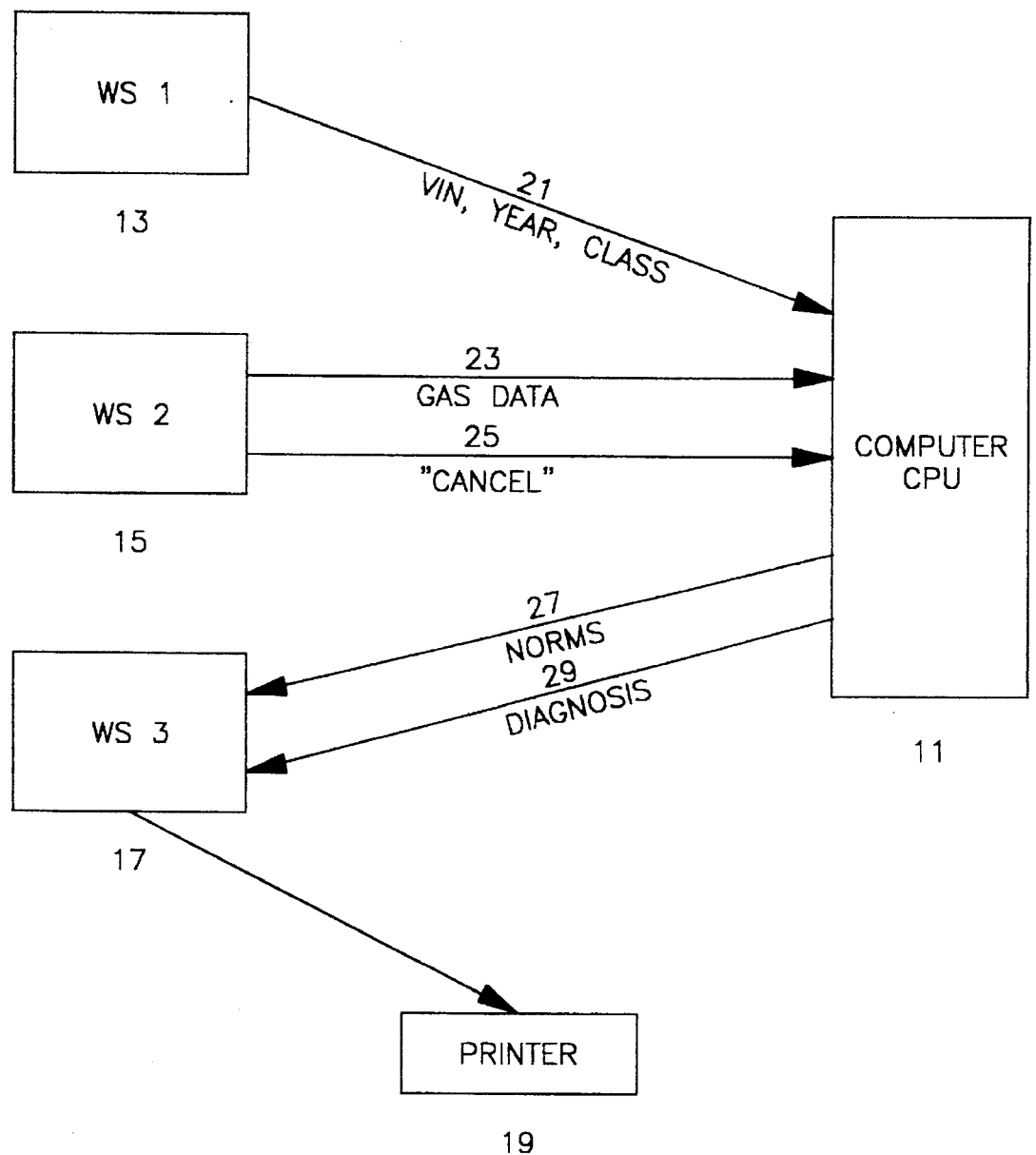
FIG. 1 is a simplified block diagram of the computer and workstations illustrating data flow of the present invention.
Figure 2:
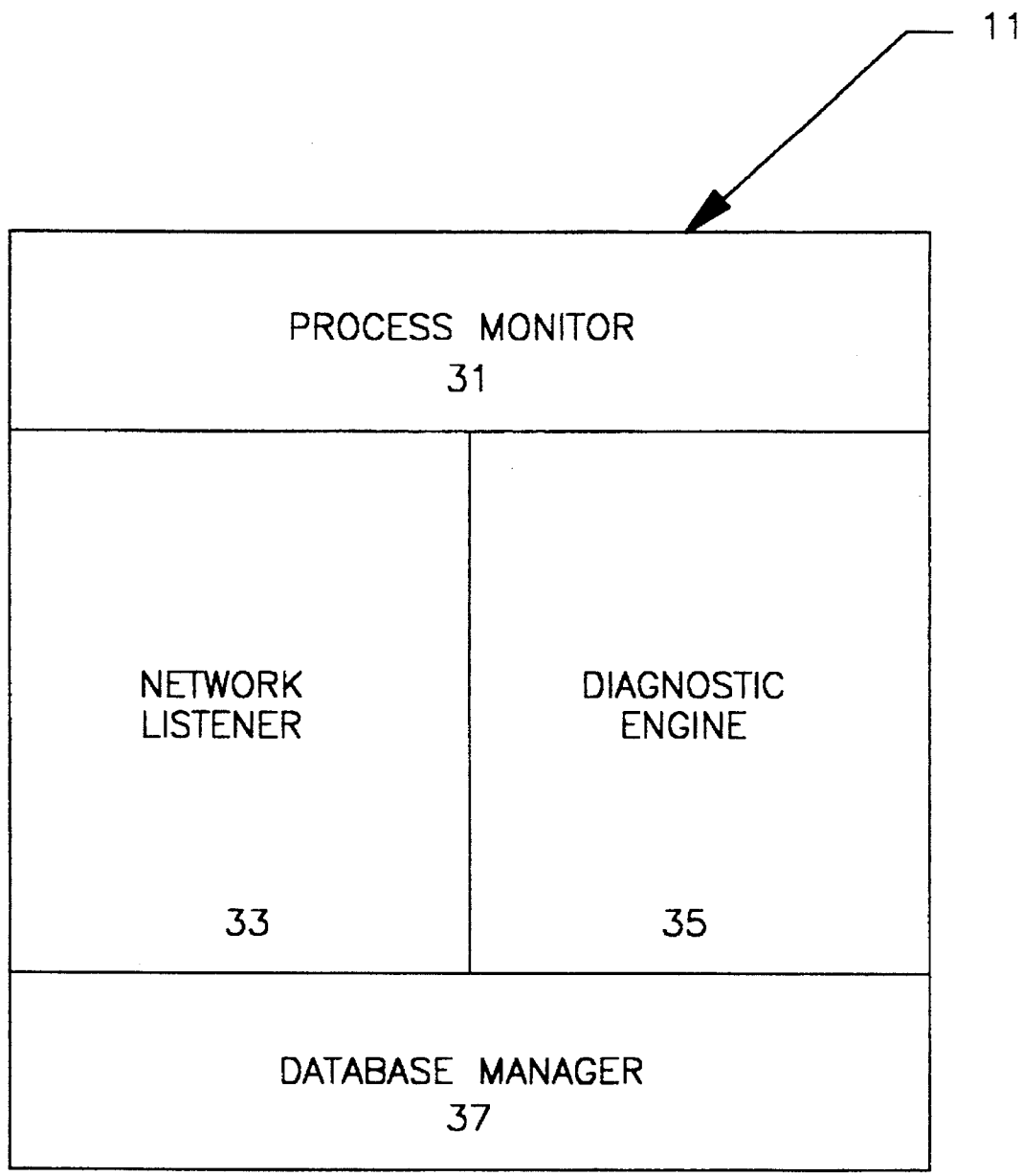
FIG. 2 is a simplified block diagram of the computer components of the system of the present invention.
Figure 3:
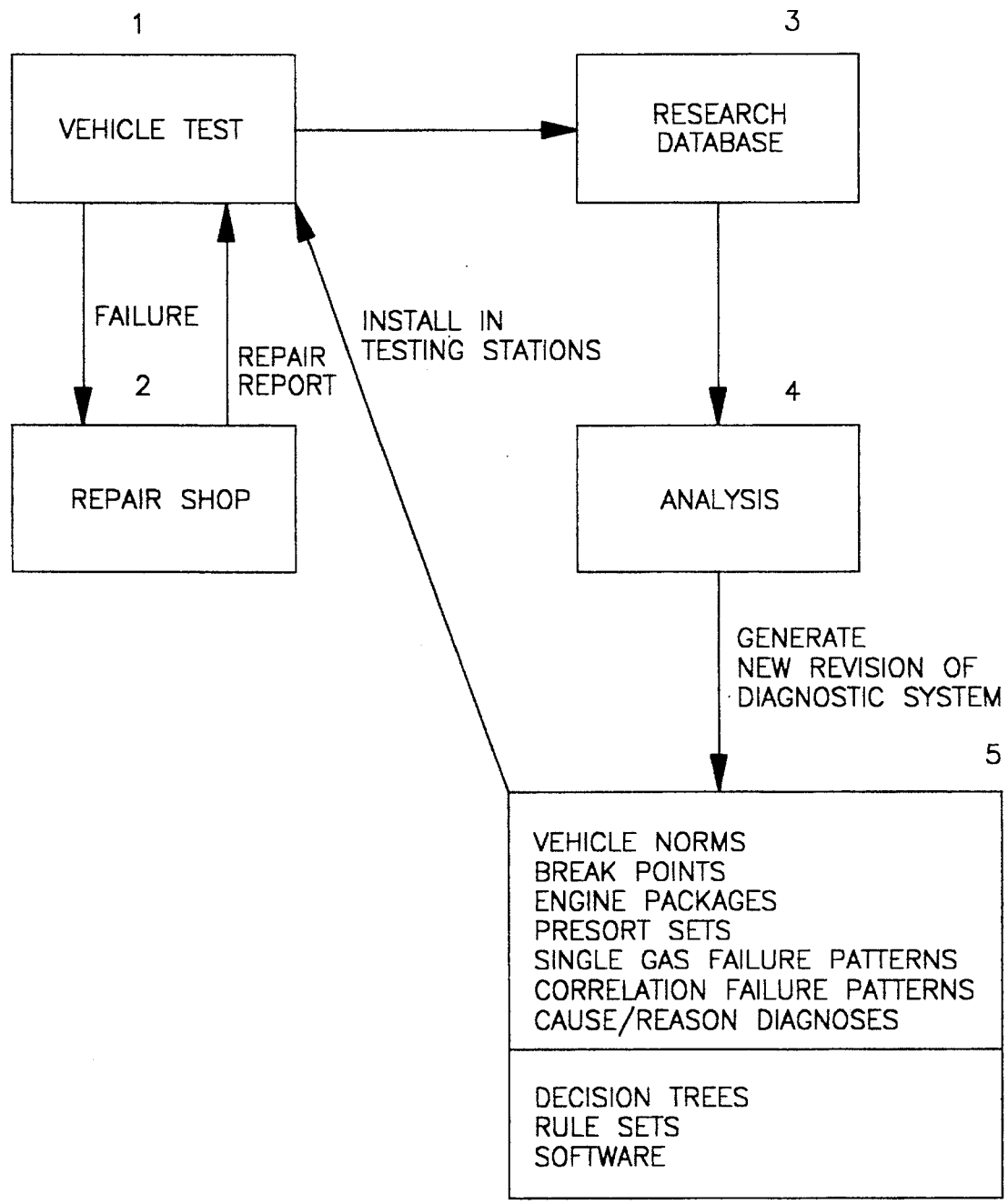
FIG. 3 is a simplified block diagram of the data flow structure of the close loop learning system according to the present invention.

In order to provide a more comprehensive understanding of the present invention, a detailed discussion of the individual components and modules will be deferred pending a general description of the overall operation of the present invention, disclosed in FIGS. 1–3, to which reference is made.

Referring to FIGS. 1 and 2, a simplified overview of the invention will be described. A programmed computer 11, controls the processing at the emission test site. Workstations 13, 15, and 17 are positioned along the vehicle testing path. At the first work station 13, the computer requests and collects the vehicle identification number, model year, and E.P.A. vehicle class. The vehicle identification number (VIN) identifies various characteristics for each vehicle, including the engine category and size. In the preferred embodiment, as shown in FIG. 2, the computer uses a Network Listener 33 for controlling such requests. It is to be understood that the present invention is not limited to a computer that utilizes a Network Listener, as the present invention can control requests in a stand-alone (non-networked) configuration. The Network Listener 33 communicates with the computer's Process Monitor 31, Database Manger 37 and Diagnostic Engine 35. The Diagnostic Engine 35 represents the content of this invention in a stand-alone configuration or as integrated into a larger system.

The Diagnostic Engine 35, (as shown in the data flow diagram FIG. 5) includes a Lookup Module, Pattern Match Module and Inference Engine. The LookUp Module (shown in detail in FIG. 6) ascertains the engine category from the VIN or vehicle class and then searches the systems data base for gas characteristics associated with that engine category and loads those characteristics in memory. The gas characteristics include failure patterns, threshold information, causes and reasons for abnormal gas concentrations, and correlation information.

After the gas characteristics have been loaded into memory, as shown in FIG. 1, the vehicle is moved to the second workstation 15, where the IM240 test is performed and the engine exhaust gas data 23 resulting from the IM240 emissions test is collected and sent back to the Computer's 11 Network listener. The vehicle is then moved to the third workstation 17.

The Network Listener forwards the gas test data to the Pattern Match Module of the Diagnostic Engine. The test data consists of 8 test parameters associated with each vehicle analyzed under a total of 240 sample periods. Of the 8 parameters, only 4 parameters have values that change during the test (HC, CO, $CO_2$, $NO_x$). The other 4 parameters are ambient temperature, air pressure, relative humidity and a flag that indicates whether reformulated (oxygenated) fuel is being used. These 4 parameters are considered to be static. It should be understood that temperature, pressure, humidity, and reformulated fuel are optional parameters and that either the use or non-use of them is included in the scope of the invention.

The Pattern Match Module (shown in detail in FIG. 7) includes a pattern Pre-Evaluation Analyzer which reduces the complexity of the test analysis by reducing the size of the data set (pre-sort) that needs to be evaluated. The Pre-Evaluation Analyzer pre-sorts the gas test data into sub-set records based on the level of gas fluctuation. The subset record is much smaller than the actual data set but has enough data to predict the engine malfunctions. Each gas has its own subset data record. Each subset data record is compared with predetermined normative breakpoint values for the same gas of the same engine class to determine the range of gas concentration into which each sample point falls. Bitmaps for each gas are formed, representing the sample point gas concentration ranges. The compared gas concentration for each data sub-set point is represented as "Low," "Nominal," "Slightly High," "Moderately High," "Very High," or "Extremely High" for $NO_x$, HC, and CO and as "High," "Nominal," "Low," "Moderately Low," "Very Low," or "Extremely Low" for $CO_2$ using a 4-bit representation. These 4-bit representations are linked together to form a bitmap pattern that is then sent to the computer's Pattern Match Analyzer. The representation of failure summaries as bitmap patterns help to improve the probability of a match, reduce the search interval, and minimize memory utilization (since, only the bitmap is loaded into memory and not the physical parametric data).

The Pattern Match Analyzer compares the failure bitmap patterns generated for each gas against a myriad of predetermined failure bitmap patterns in order to identify the engine failure of each gas. When the newly generated failure bitmap patterns match up with predetermined failure bitmap patterns, the Pattern Identifications (Failure Signature Codes) associated with those patterns are passed to the Cause/Reason Analyzer of the Inference Engine to refine the diagnosis based on data included in the Engine Package record.

If the Pattern Identifications (Failure Signature Codes) for the matched pattern records are not consistent (they disagree about the diagnosis), or one or more of the pattern records are flagged as intermediate results, or one of the patterns could not be identically matched, the Pattern Match Analyzer, links the four Pattern Identifications together to form a Correlation Pattern. Where one of the bitmap patterns does not match, a special "No Match" Pattern Identifications is used in forming the Correlation Pattern. The Correlation Pattern Analyzer compares the Correlation Pattern created against a myriad of Predetermined Correlation Patterns in order to identify the correlated failure of the four gases. When the newly generated Correlation Pattern matches up with a Predetermined Correlation Pattern, the Correlation Pattern Identification (Failure Signature Code) associated with this Correlation Pattern is passed to the Cause/Reason Analyzer of the Inference Engine (shown in FIG. 8) to refine the diagnosis based on data included in the Engine Package record.

Figure 13A:
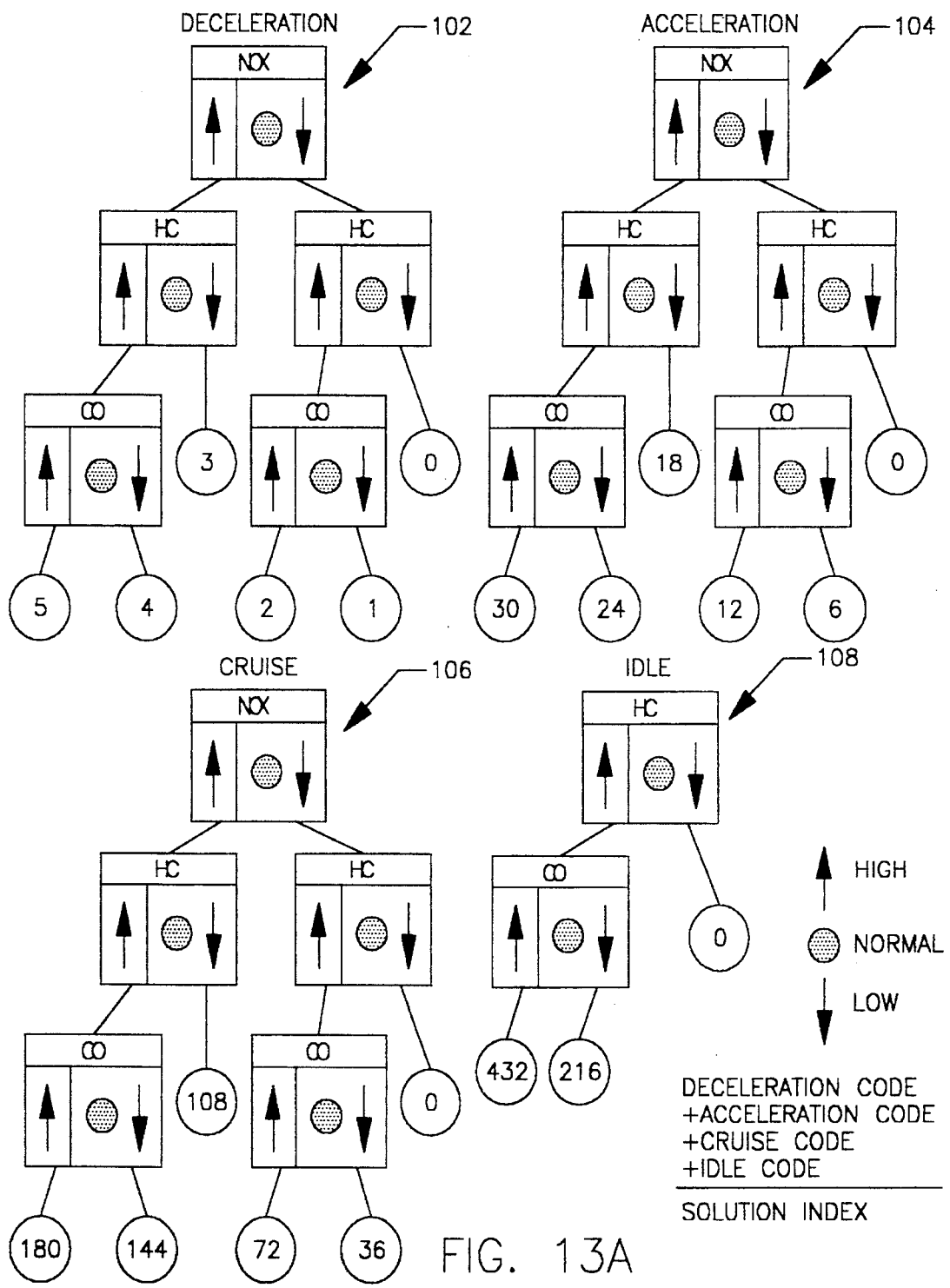
FIG. 13a illustrates the decision tree processing of the inference engine of the present invention.

On the other hand, if two or more of the failure bitmap patterns cannot be identically matched with any of the predetermined failure bitmap patterns or if the Correlation Pattern cannot be matched with a Predetermined Correlation Pattern, the Inference Engine is requested to find a theoretical diagnosis based on the raw test data for the three gases $NO_x$, HC and CO. The Inference Engine, (shown in FIG. 8) provides a backup to the Pattern Match and also refines the diagnosis based on the engine control package used in the vehicle. The Inference Engine's Gas Elevation Analyzer breaks the 240 second driving cycle into four phases: "Idle," "Cruise," "Acceleration," and "Deceleration," and analyzes the raw test data. For each gas for each phase of the driving cycle, the category into which the statistical median concentration falls is determined. The concentrations for the three gases are categorized as "Low to Nominal" and "Slightly to Extremely High." For each gas for each phase of the driving cycle, the statistical upper mode of the concentration categories is also determined. The concentrations for the three gases being categorized as "Low to Nominal," "Slightly High," "Moderately High," "Very High," or "Extremely High." These median concentration categories are used by the Inference Engine's Solution Index Generator along with a set of decision trees (shown in FIGS. 13a & 13b) to generate an index to a rule set table. This table has 648 entries, one for each possible Solution Index value. Each entry in this table has either a Theoretical Pattern Identification (Failure Signature Code) or pointer to a procedure (Supplemental Processor) to be run in order to generate a Theoretical Pattern Identification (Failure Signature Code). The Supplemental Processor may make use of the gas level distribution data (median and upper mode) generated by the Gas Elevation Analyzer in its analysis. The Theoretical Pattern Identification (Failure Signature Code) is then passed to the Cause/Reason Analyzer to refine the diagnosis based on data included in the Engine Package record.

The Cause/Reason Analyzer, uses the Failure Signature Code (which may be: the common gas Pattern Identification from the Pattern Match Analyzer; or the Correlation Pattern Identification from the Correlation Pattern Analyzer; or the Theoretical Pattern Identification from the Inference Engine) as a key into the cause and reason information tables stored in the Diagnosis Data Store. The cause table includes descriptive information about the gas behaviors and the reason table contains a matrix of associated engine malfunctions. The engine package information from the Lookup module is used to select the specific diagnoses appropriate to the components on the engine being tested. After the cause and reason for the engine malfunction has been determined, as shown in FIG. 1, a diagnosis is sent to the testing facilitator at the third workstation 17, and the information is printed, 19, for the user.

In FIG. 2 the functions indicated by the Process Monitor and Database Manager are those provided by the systems software portion of the programmable computer and are not to be considered part of this invention.

In addition to the diagnostic server being integrated into an IM240 testing lane, the present invention provides an emission testing data diagnostic system having a closed loop learning system for tracking, processing and storing problems associated with engines and what repairs were performed to correct engine malfunctions causing the abnormal concentration levels. FIG. 3 is illustrative of the closed loop learning system which begins with the vehicle being subjected to an emissions test 1. If the vehicle passes the emissions test, the data collected is forwarded to a research data base 3 for inclusion into the system data base as a set of gas concentration readings representing a properly functioning engine. If the vehicle fails the emissions test, a diagnosis and repair report is generated for the vehicle owner to assist in the vehicle's repair 2. The individual who repairs the engine must fill out the report, indicating what the cause of the problem was determined to be and what was repaired to remedy the problem. The report is to be returned with the vehicle when retested 1. The original failure and other data recorded on the diagnosis and repair report is forwarded to the research database 3 along with the success or failure of the repair for inclusion into the data base as new success and failure patterns having associated causes and reasons associated with the failure. An analysis is performed to add the new information to the latest version of the system data base 4. The next revision of the system deployed in the field 5 will include the data generated from these vehicle tests so that the system is constantly learning about causes and reasons for engine failure.

DESCRIPTION OF THE PREFERRED EMBODIMENTS

In the following detailed description of the preferred embodiment, reference is made to the accompanying drawings which form a part hereof and in which is shown by way of illustration an exemplary embodiment and a description having sufficient detail to enable those skilled in the art to practice the invention. It is to be understood that other embodiments may be utilized and that structural or logical changes may be made without departing from the scope of the present invention. The following detailed description is, therefore, not to be taken in a limiting sense, and the scope of the present invention is defined by the appended claims.

Network Listener

Each vehicle test performed will have a unique test identification attached to it. Each request from a workstation will use that test identification in order to differentiate requests from multiple test lanes and multiple vehicles in the same test lane.

Figure 4:
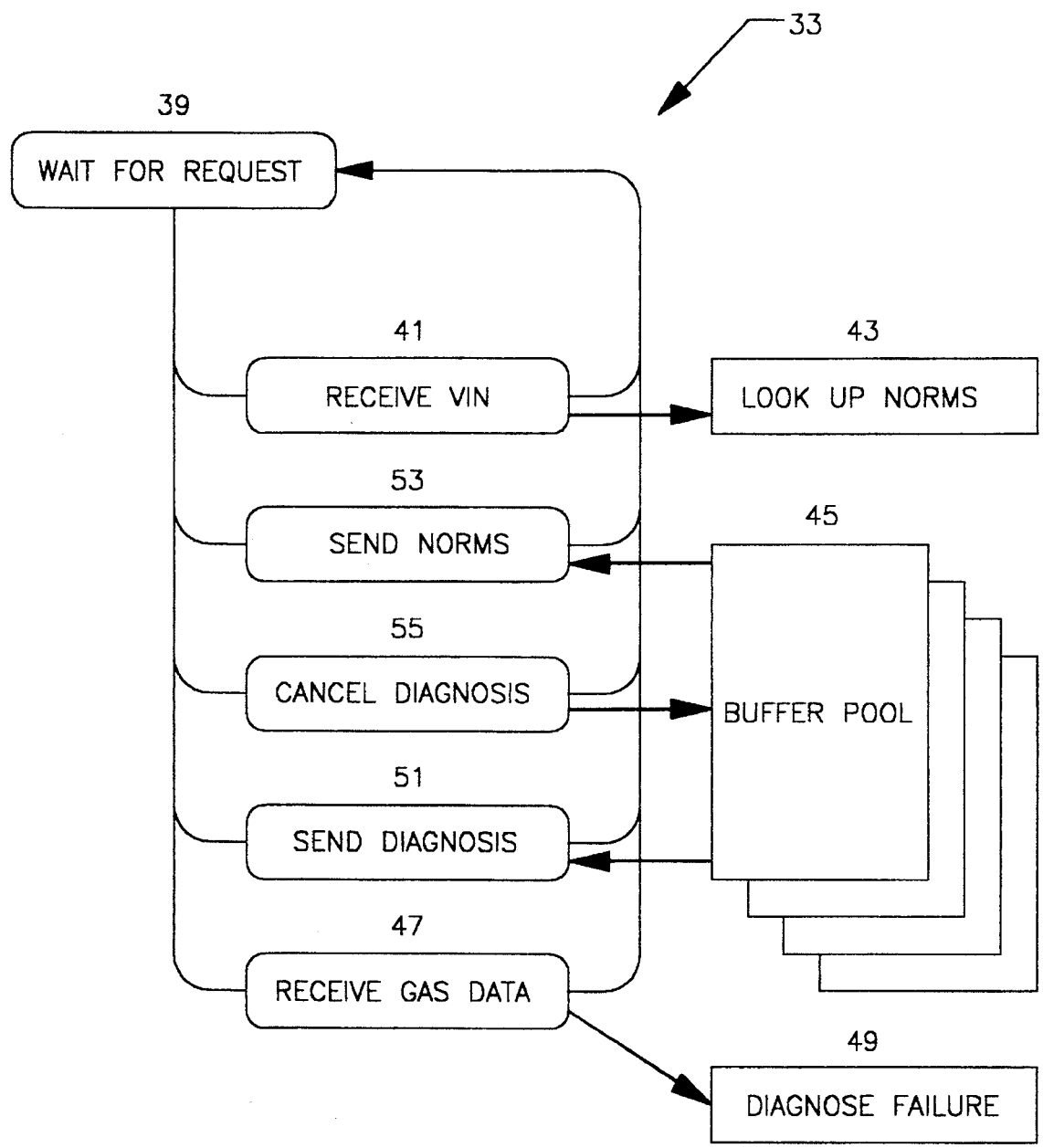
FIG. 4 is a state transition diagram of the computer during processing of the present invention.

When a vehicle enters the first workstation of the testing facility, the Network Listener, as shown in the state transition diagram FIG. 4, is in a standby mode waiting for a client request 39. The first request received 41 (Receive VIN), made by the testing facilitator, switches the system from standby mode to data collection mode (not shown). The data collection mode allows the Network Listener to receive vehicle information (VIN, model year, and E.P.A. class) from the client workstation. When a receipt is complete, the Network Listener instructs the Diagnostic Engine to perform a VIN search 41. The Diagnostic Engine then looks up 43 the predetermined gas characteristics for the particular engine class defined by the VIN or by model year and E.P.A. class, and loads them into memory 45. The predetermined gas characteristics that are retrieved include normative raw data.

After the IM240 emissions test is performed, the vehicle engine exhaust gas data resulting from the IM240 emissions test is received by the system 47. The exhaust gas data received will be a subset (fewer attributes) of the actual test data collected by the workstation. The actual test data collected is a Full IM240 test data set for the four gases in both concentration and grams/mile, both second by second and cumulative over the test, expected and actual speed, distance traveled, plus the temperature readings and the humidity readings. The test data subset for the four gases consists of four data attributes, one for each gas type second-by-second concentrations only, consisting of 240 data readings. After the subset of gas test data has been received, the Network Listener invokes the Diagnostic Engine to analyze and perform a diagnosis for determining engine malfunctions 49. The analysis, summary and diagnosis results are then loaded into memory 45 so they can be sent back to the client system.

When a request is received from the third workstation for norms data, the Network Listener 33 is switched into send norms mode 53 and the raw normative data is sent from memory to the requesting workstation. In the event the norms have been delayed in loading into memory, sending the data is deferred until available.

When a request is received from the third workstation 17 (shown in FIG. 1) for a diagnosis, the Network Listener is switched into send diagnosis mode 51 and the diagnosis is sent from memory to the requesting workstation. In the event the diagnosis has been delayed in loading into memory, sending the data is deferred until available.

The Network Listener also provides the option of canceling the engine diagnosis at any time if such a command is issued 55. Upon receiving a request to cancel, the network listener would unload all failure bitmaps from memory 45, and continue to wait for the next request 39.

The Full IM240 test schedule requires the testing facilitator to specify a driving pattern to be followed by the driver. However, if the tolerance for deviating from the scheduled driving pattern was either greater than or less than the EPA requirements, the test is considered invalid. This is one situation that would cause the test facilitator to request that engine diagnosis be cancelled. Another situation would be if the vehicle passed the test so that no diagnosis would be required.

Diagnostic Engine

Figure 5:
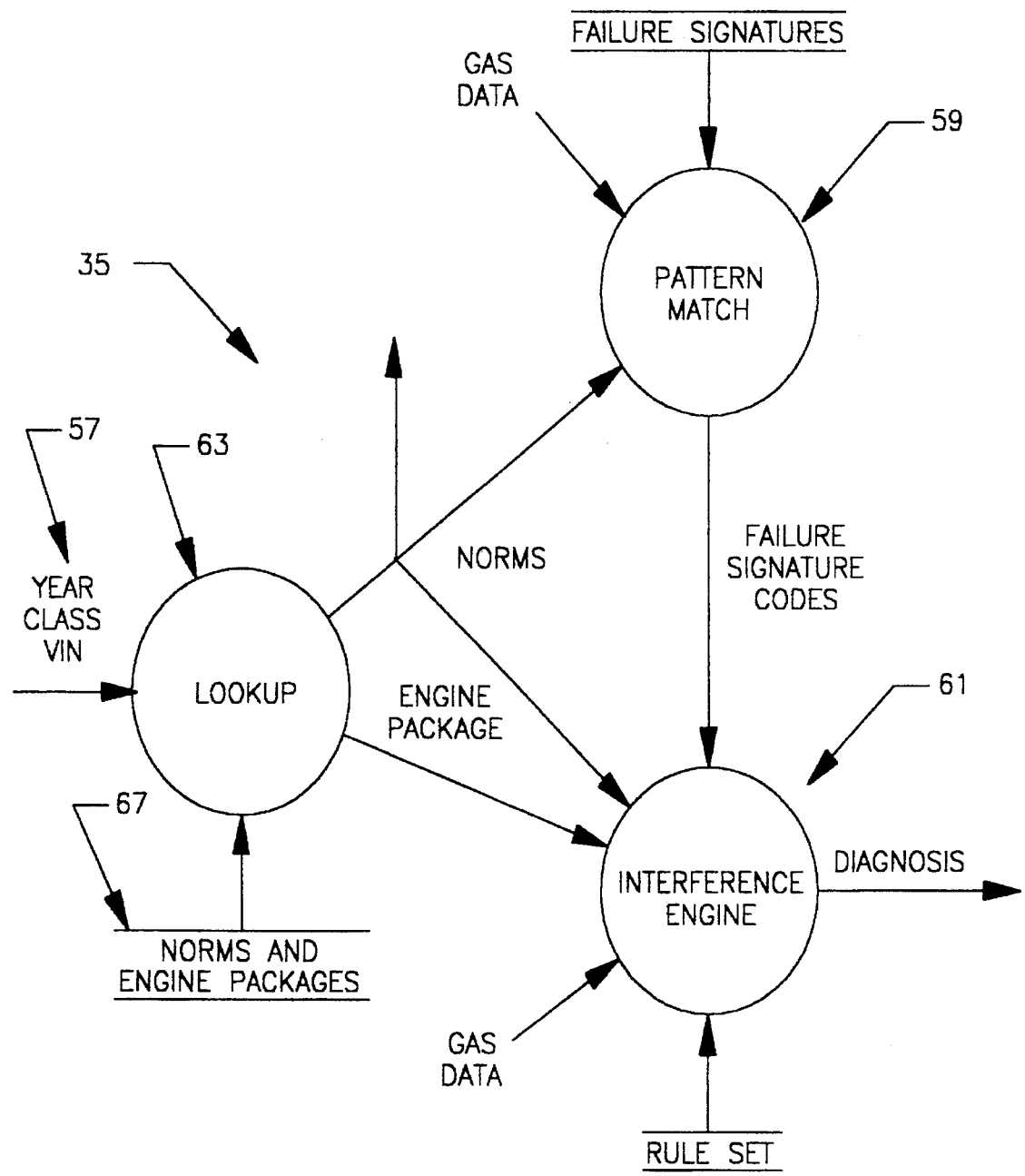
FIG. 5 is a diagnostic engine data flow diagram illustrating data flow between the diagnostic engine modules of the present invention.
Figure 6:
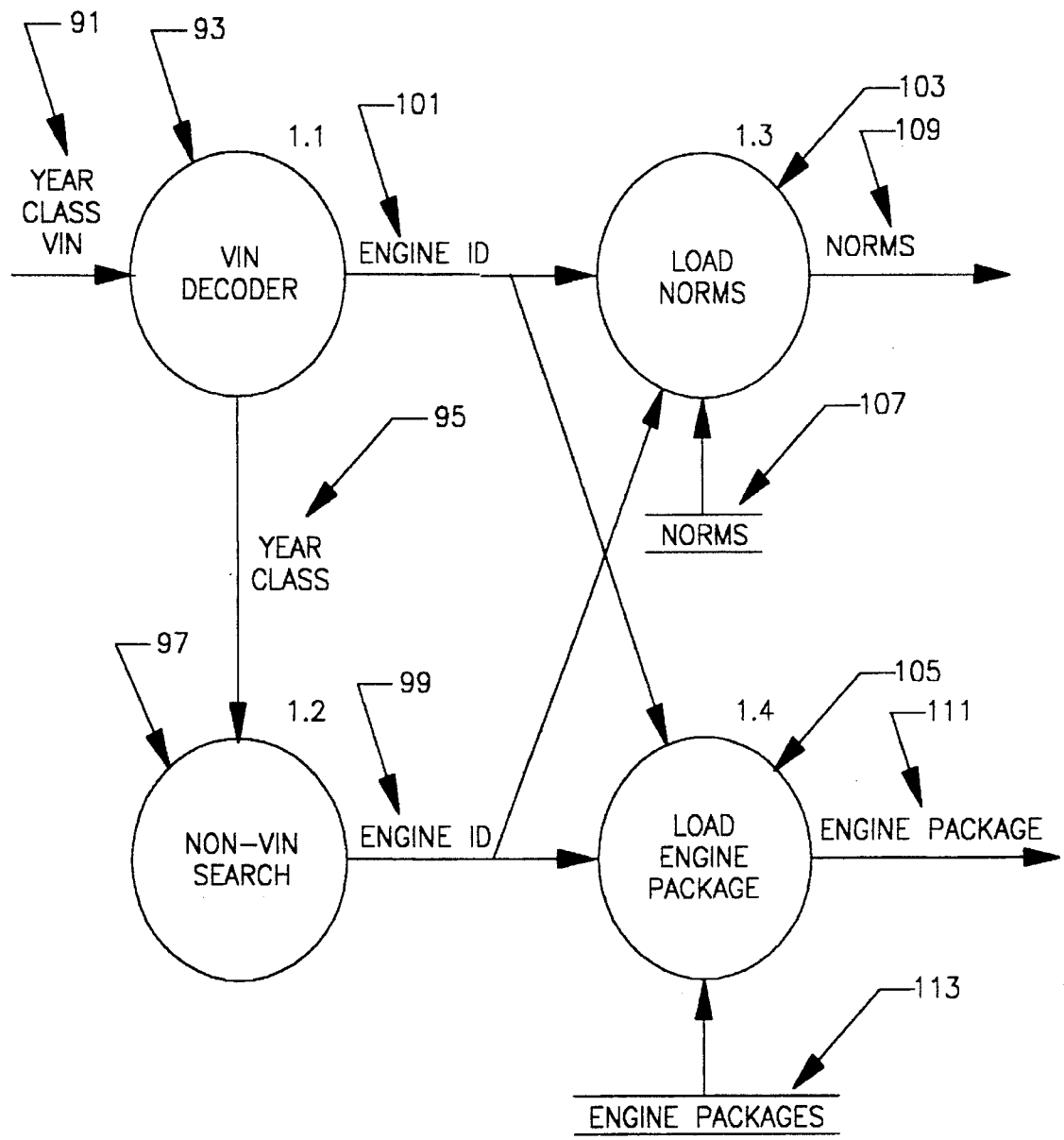
FIG. 6 is the look up module's data flow diagram illustrating data flow through the look up module of the present invention.
Figure 7:
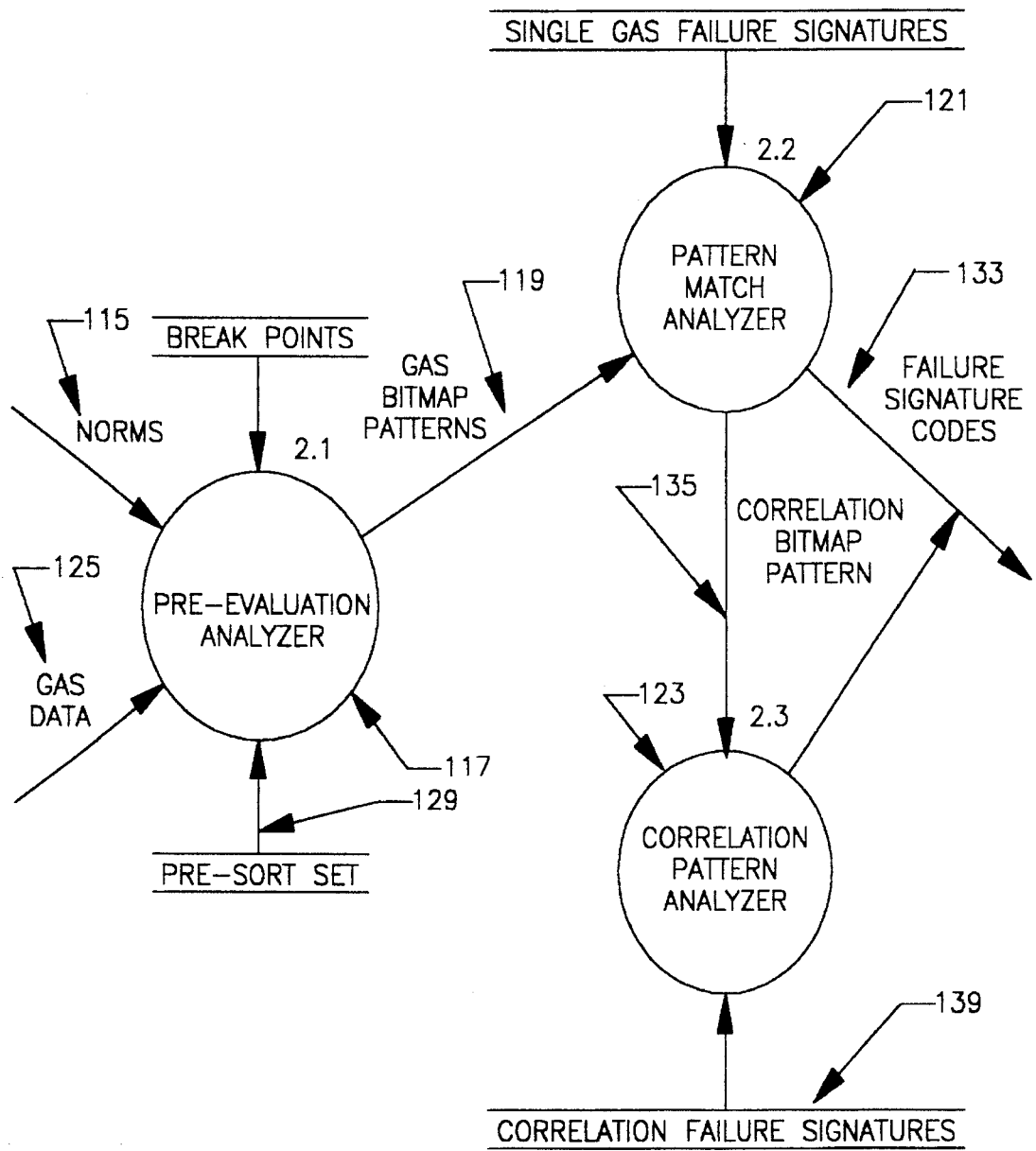
FIG. 7 is the pattern match module data flow diagram illustrating data flow through the pattern match module of the present invention.
Figure 8:
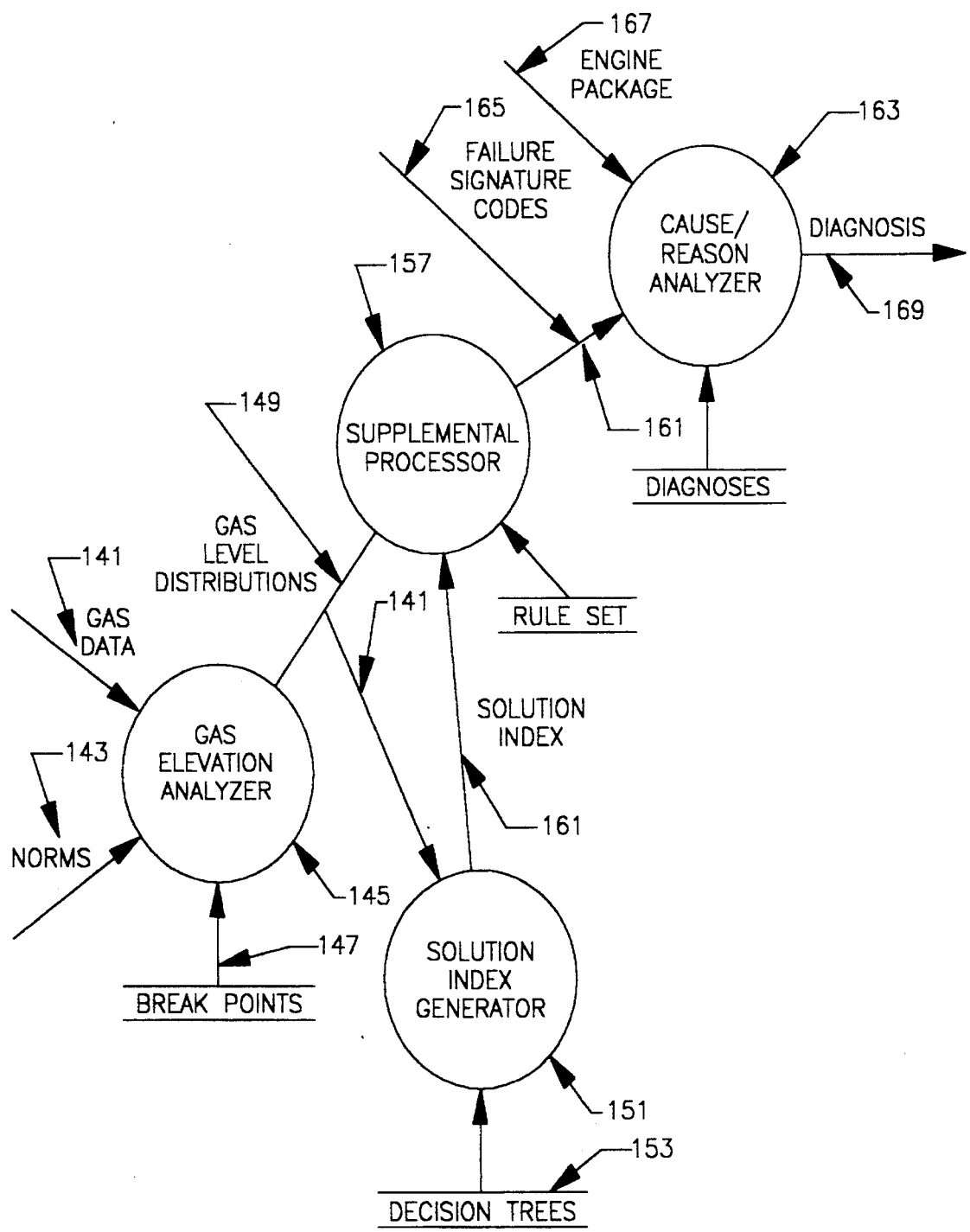
FIG. 8 is the inference engine data flow diagram illustrating data flow through the inference engine of the present invention.
Figure 9A:
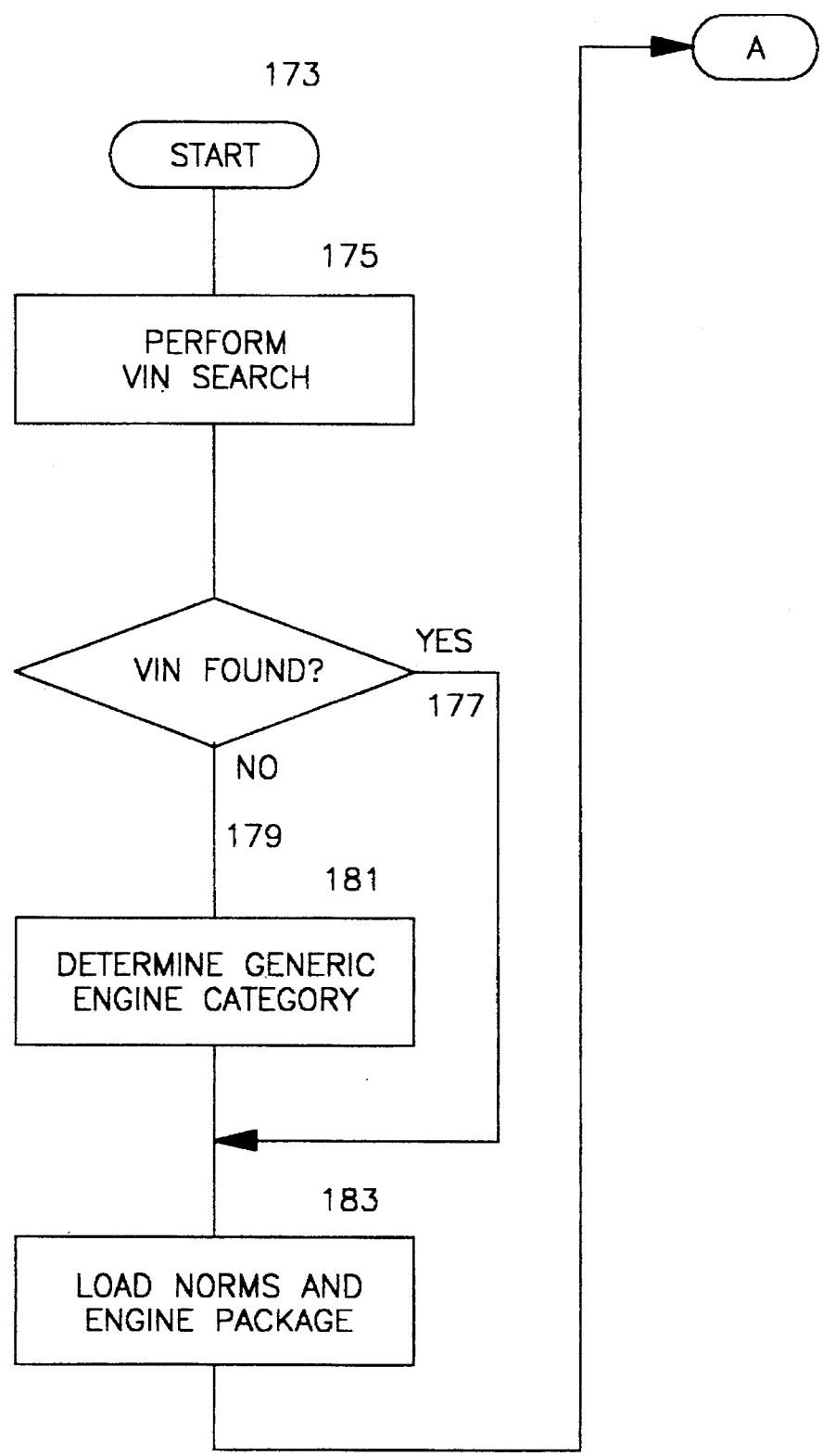
FIGS. 9a–9c illustrate flow of control between the diagnostic engine components.
Figure 9B:
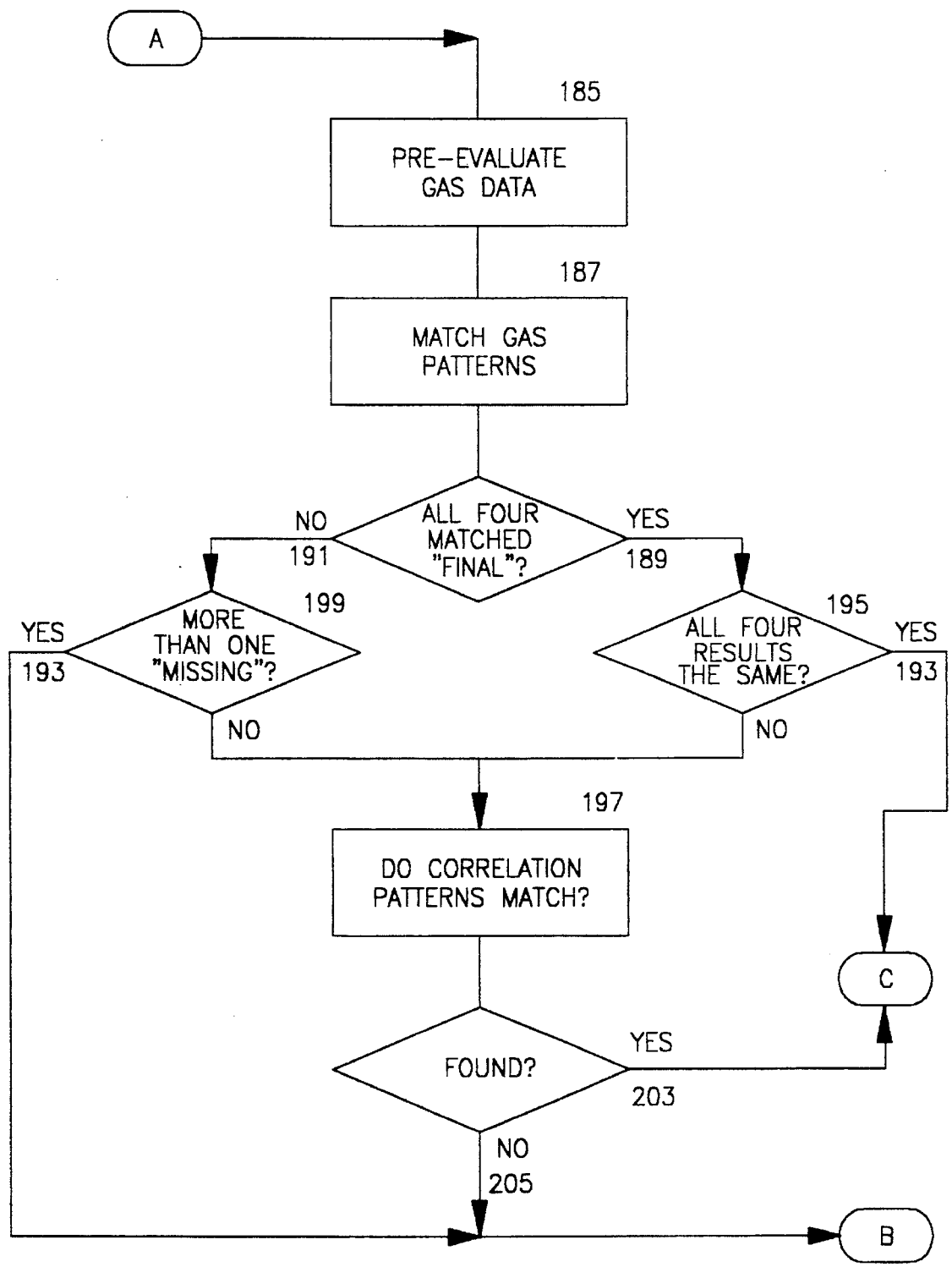
Figure 9C:
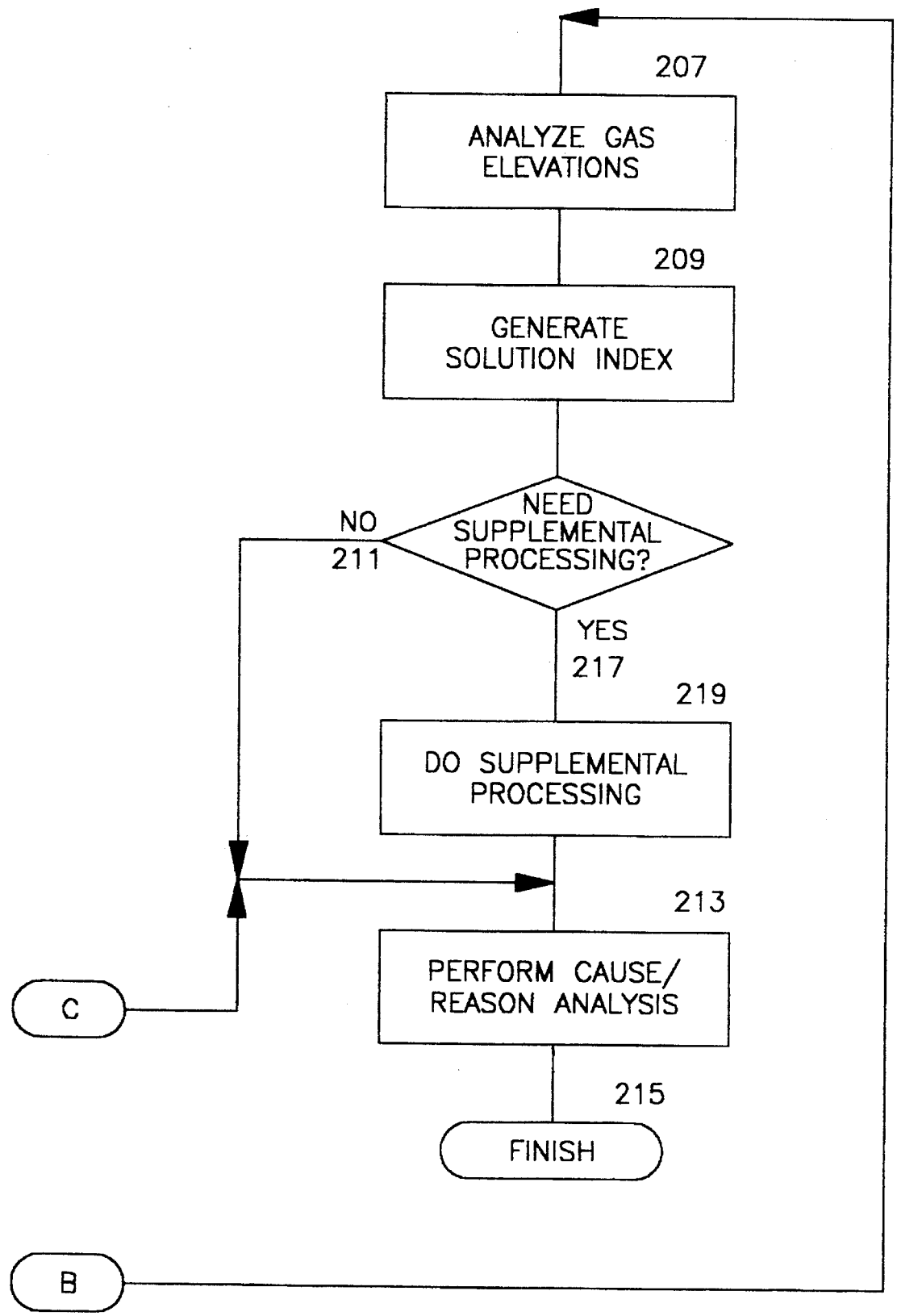

The Diagnostic Engine 35, shown in FIG. 5, consists of three main parts: an Engine Lookup Module 63, a Pattern Matching Module 59 and an Inference Engine 61. Data flows through these modules within the Diagnostic Engine as shown in FIG. 5. The flow of control between these modules is shown in FIGS. 9a–9c. FIGS. 6, 7 and 8 illustrate the first level data flow decomposition of the three Diagnostic Engine Modules.

Lookup Module

The Lookup module identifies the engine norms and control package 67 to be used in diagnosing the engine failure. Lookup module processing shown in FIG. 9a begins 173 with the performance of the VIN search 175 of the systems data base for gas characteristics associated with that engine category. If the VIN is found 177, the engine gas characteristics are loaded into memory 183. If the VIN is not found 179, a generic engine category is determined 181, based on the EPA vehicle class and year of vehicle, and then the engine gas characteristics are loaded into memory 183.

Data flow through the Lookup module is shown in FIG. 6. First, the Lookup module performs a VIN search by calling a VIN Decoder routine 93 to identify the vehicle's engine based on Country Code (VIN digit 1), Manufacturer ID (VIN digits 2 and 3), Year (VIN digit 10), Engine Code (VIN digit 8), and potentially other digits in the World standardized VIN 91. Prior to 1981, VIN code formats were not standardized. In another embodiment, a pre-1981 VIN decoding method can be part of the software package.

If the VIN is found 101, the Diagnostic Engine then looks up the predetermined gas characteristics for the particular engine class (not shown) defined by the VIN 91 and loads them into memory 103, 105.

Where a VIN Lookup is unsuccessful 95, (obscure Make/Model of vehicle, VIN data entry in error, etc.) the model year and E.P.A. vehicle class which are entered at the same time as the VIN are searched 97 to determine a generic engine category 99. The Diagnostic Engine then looks up the predetermined gas characteristics for the generic engine category (not shown) and loads them into memory 103, 105.

The predetermined gas characteristics that are retrieved include gas norms 107, (which include normative raw data, gas threshold levels, failure bitmap patterns, correlation patterns, and cause/reason information for engine failures) and an engine control package component list 113.

Pattern Match Module

The Pattern Match module (shown in FIGS. 7 and 9b) consists of, as shown in FIG. 7, a Pre-Evaluation Analyzer 117, a Pattern Match Analyzer 121, and a Correlation Pattern Analyzer 123.

The Pattern Match module data flow control is shown in FIG. 9b. It compares test gas data to normative data in order to identify a failure pattern associated with a set of component failures. This is done by pre-evaluating 185 the engine exhaust data received, and then comparing the failure bitmap patterns generated for each gas against the predetermined failure bitmap patterns 187 stored for the engine class and gas type of the vehicle being tested. Pre evaluation of the new data is done in order to identify the failure of each gas. If all four bitmap patterns for each gas finds a match 189, the system then determines whether the cause/reason for the engine failure that is associated with each of the predetermined gas patterns that have been matched is the same. If all four gases have identical cause/reasons associated with the engine failure 193, the system bypasses all other processing and diagnoses the problem ending the analysis (not shown).

On the other hand, when the four gas bitmap patterns, for which matches have been found do not have the same cause/reason associated with the abnormal gas readings from which the bitmap patterns were generated 195, the system performs a correlation/comparison 197 to pinpoint the correct diagnosis to the problem. In the same respect, if one of the four generated bitmap patterns does not find a match 199 with a predetermined failure bitmap pattern, the system will perform a correlation comparison analysis 197 to diagnose the engine malfunction. If the correlation comparison analysis finds a match for the generated correlation pattern identification with one of the predetermined stored correlation pattern identifications 203, the system bypasses all other processing and diagnoses the problem ending the analysis (not shown). However, if no matching predetermined stored correlation pattern id is found 205, or if more than one generated bitmap pattern is missing 201, resulting in more than one bitmap pattern not finding a match, the system utilizes an inference engine (shown in FIG. 9c) to determine the proper diagnosis for the engine malfunction.

Data flow through the Pattern Match Module is shown in FIG. 7. After the gas norms have been looked up, they are sent 115 to the Diagnostic Engine's Pre-Evaluation analyzer 117 along with the gas data 125 generated through the IM240 test. The Pre-Evaluation Analyzer 117 pre-sorts the raw test data, based on the Pre-sort set 127 definition and performs an analysis on the presorted data set for purposes of creating bitmap patterns. The bitmap patterns 119 are created based on a comparison of the presort set of generated gas data to the predetermined breakpoints for the same gas of the same engine class. Bitmap patterns represent the sample point gas concentration ranges. The generated bitmap patterns 119 are sent to the Pattern Match Analyzer 121 for comparison with predetermined bitmap patterns. If all four of the bitmap patterns generated are matched, and the diagnosis associated with each is the same, the failure signature codes 133 are sent to the cause/reason analyzer (not shown) so that the problem can be diagnosed. If one of the bitmap patterns generated is not matched a correlation bitmap pattern is formed and sent 135 to the correlation pattern analyzer 123 where the correlation bitmap pattern is compared to predetermined correlation bitmap patterns. If a Correlation bitmap Pattern match is found, the failure signature code 139 associated with the predetermined correlation bitmap pattern is sent 137 to the cause/reason analyzer (not shown) so that the problem can be diagnosed. When the correlation bitmap pattern is not matched or if more than one bitmap pattern is not matched, the Inference Engine is initiated to diagnose the problem (not shown).

Pattern Matching uses a set of ten states during the IM240 driving cycle, as shown in Table 1 below:

TABLE 1

| States Used In Pattern Matching | |
| --- | --- |
| ID = Idle. | The speed of the vehicle is zero. |
| LC = Low Cruise. | The speed of the vehicle is less than 29 miles per hour. |
| MC = Medium Cruise. | The speed of the vehicle is 29 to 48 miles per hour. |
| HC = High Cruise. | The speed of the vehicle is more than 48 miles per hour. |
| LA = Light Acceleration. | The speed of the vehicle is increasing at between 0.65 and 1.65 mile/hour per second. |
| MA = Medium Acceleration. | The speed of the vehicle is increasing at between 1.65 and 2.65 mile/hour per second. |
| HA = Hard Acceleration. | The speed of the vehicle is increasing at more than 2.65 mile/hour per second. |
| LD = Light Deceleration. | The speed of the vehicle is decreasing at between 0.65 and 1.65 mile/hour per second. |
| MD = Medium Deceleration. | The speed of the vehicle is decreasing at between 1.65 and 2.65 miles/hour per second. |
| HD = Hard Deceleration. | The speed of the vehicle is decreasing at more 2.65 miles/hour per second. |

Figure 10:
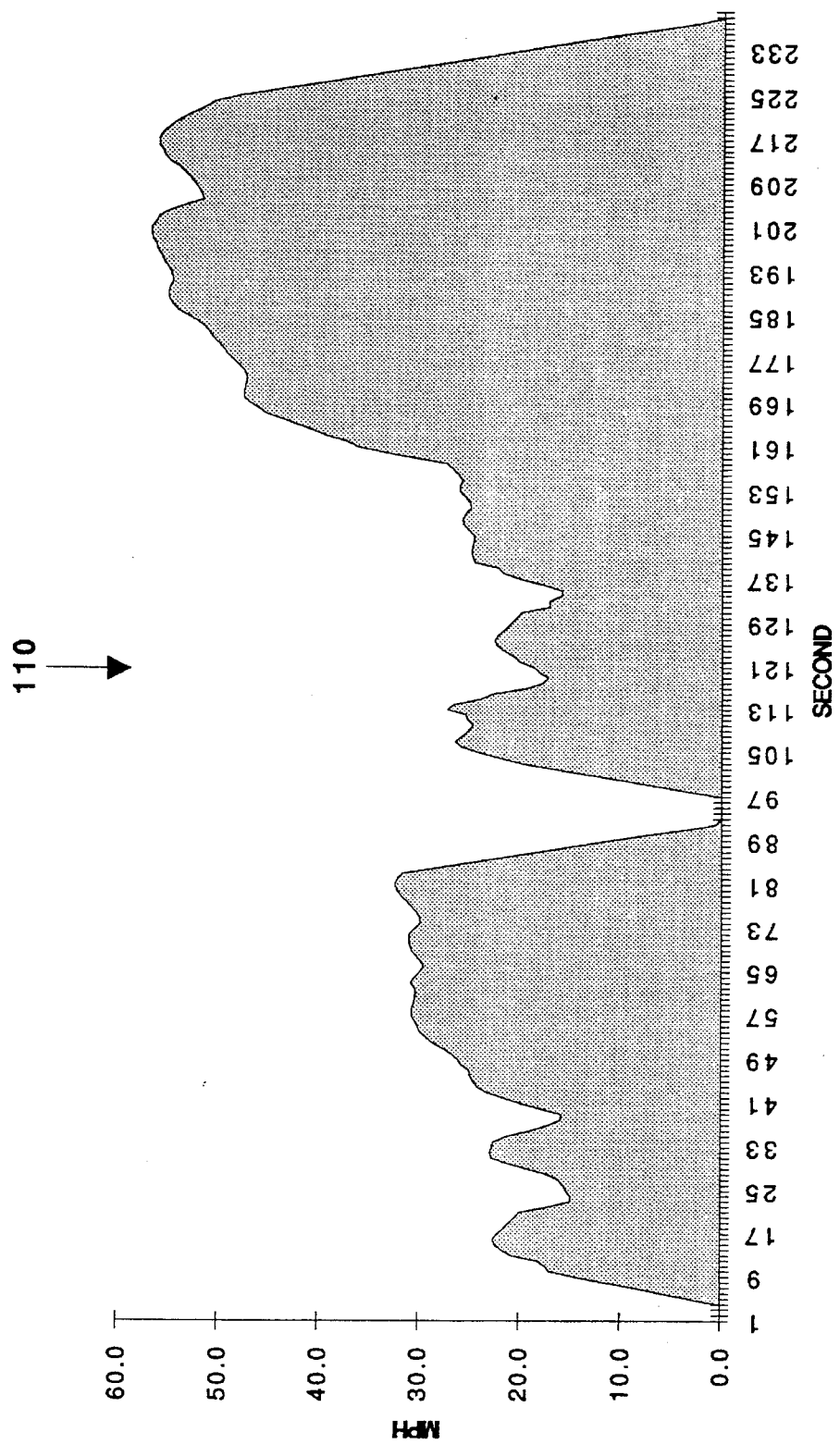
FIG. 10 is a speed chart based on the standard IM240 driving cycle.
Figure 11:
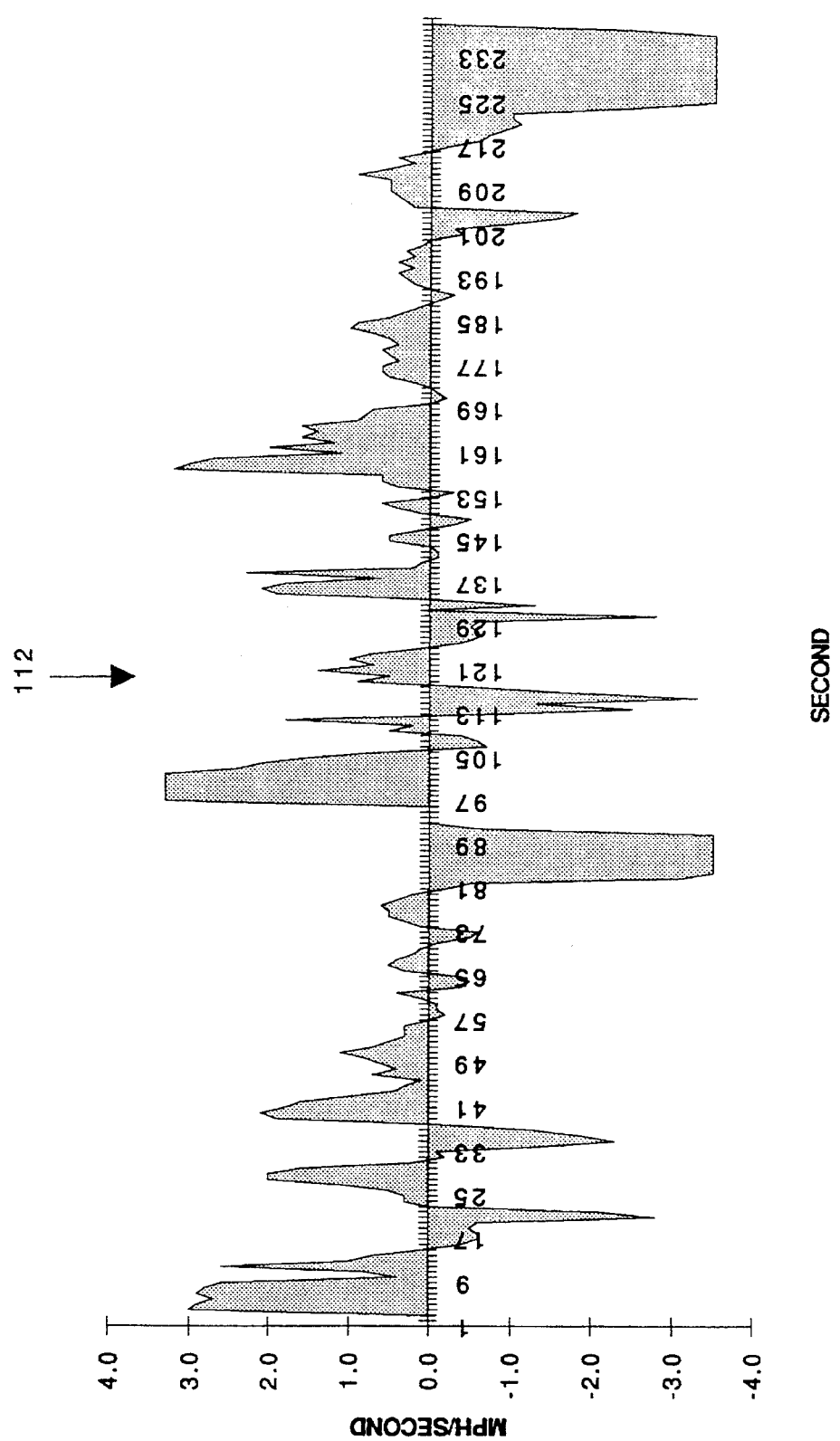
FIG. 11 is an acceleration chart based on the standard IM240 driving cycle.

FIGS. 10 and 11, at 110 and 112, show the IM240 test schedule. A sample of predetermined datapoints used to generate a speed chart such as that shown in FIG. 11 is shown below in Table 2:

TABLE 2

| Sample Predetermined Datapoints | | |
| --- | --- | --- |
| States | Secs | Expected Speed |
| ID | 1 | 0 |
| HA | 6 | 6.1 |
| MA | 7 | 8.7 |
| MA | 8 | 11.8 |
| LA | 15 | 22.4 |
| LC | 18 | 21.5 |
| MD | 23 | 14.9 |
| LC | 24 | 14.9 |
| LA | 32 | 22.9 |
| LC | 34 | 22.6 |
| MD | 38 | 15.8 |
| LA | 47 | 25 |
| LC | 49 | 26.1 |
| LA | 54 | 29.8 |
| MC | 55 | 30.1 |
| MC | 56 | 30.4 |
| MC | 59 | 30.5 |

TABLE 2-continued

Sample Predetermined Datapoints

| States | Secs | Expected Speed |
|---|---|---|
| MC | 64 | 30.4 |
| MC | 65 | 29.9 |
| MC | 70 | 30.9 |
| MC | 72 | 30.9 |
| MC | 77 | 30.7 |
| MC | 78 | 31.2 |
| MC | 79 | 31.8 |
| MC | 80 | 32.2 |
| MC | 81 | 32.4 |
| MC | 82 | 32.2 |
| HD | 88 | 14.5 |
| HD | 89 | 10.7 |
| HD | 90 | 7.4 |
| LD | 93 | 0 |
| ID | 96 | 0 |
| HA | 99 | 7 |
| HA | 101 | 13.6 |
| HA | 102 | 16.7 |
| LA | 108 | 25.7 |
| LC | 109 | 25.1 |
| MD | 118 | 17.7 |
| LA | 124 | 21.7 |
| LC | 127 | 22.1 |
| LC | 141 | 24.7 |
| LC | 156 | 26.1 |
| MA | 165 | 42.1 |
| MC | 166 | 43.5 |
| LA | 168 | 46 |
| MC | 169 | 46.8 |
| MC | 175 | 47.4 |
| LA | 181 | 50.6 |
| HC | 182 | 51 |
| LA | 187 | 54.6 |
| HC | 192 | 54.6 |
| HC | 194 | 55.1 |
| HC | 197 | 56.1 |
| HC | 202 | 56.3 |
| HC | 214 | 55.4 |
| HC | 218 | 55.8 |
| HD | 231 | 27 |
| HD | 232 | 23.5 |
| MD | 239 | 0 |
| ID | 240 | 0 |

Vehicle Norms: High/Low Break Points

The determination of normal vs abnormal data ranges for the four gases is critical to the success of both the pattern match module and the inference engine. The method presented here is to begin with a normal profile for each gas over the 240 seconds of the I/M 240 driving cycle and to set break points on an exponential curve relative to normal.

Where N is a normal gas reading, break points can be set at values of $\{N \cdot e^x\}$ where x are integers in the range of $-4$ to 4. Data ranges can then be set using those break points as approximated by the data shown below in Table 3:

TABLE 3

Data Ranges For Setting Break Points

| Extremely Low | $L4 < 0.018\ N$ |
|---|---|
| Very Low | $0.018\ N \leq L3 < 0.050\ N$ |
| Moderately Low | $0.050\ N \leq L2 < 0.14\ N$ |
| Slightly Low | $0.14\ N \leq L1 < 0.37\ N$ |
| Nominal | $0.37\ N \leq N0 \leq 2.7\ N$ |
| Slightly High | $2.7\ N < H1 \leq 7.4\ N$ |
| Moderately High | $7.4\ N < H2 \leq 20\ N$ |
| Very High | $20\ N < H3 \leq 54\ N$ |
| Extremely High | $54\ N < H4$ |

It is not necessary to use all nine ranges with any of the four gases. For Nox, HC, and CO the primary concern is with high readings. For $CO_2$ the primary concern is with low readings. Only six data ranges are needed with each gas as shown in the following Table 4:

TABLE 4

Data Ranges Used

| | $NO_x$ | HC | CO | $CO^2$ | |
|---|---|---|---|---|---|
| L1 | $N \cdot e^{-1}$ | $N \cdot e^{-1}$ | $N \cdot e^{-1}$ | $N \cdot e^{-1}$ | H1 |
| N0 | $N \cdot e^0$ | $N \cdot e^0$ | $N \cdot e^0$ | $N \cdot e^0$ | N0 |
| H1 | $N \cdot e^{-1}$ | $N \cdot e^{-1}$ | $N \cdot e^{-1}$ | $N \cdot e^{-1}$ | L1 |
| H2 | $N \cdot e^{-2}$ | $N \cdot e^{-2}$ | $N \cdot e^{-2}$ | $N \cdot e^{-2}$ | L2 |
| H3 | $N \cdot e^{-3}$ | $N \cdot e^{-3}$ | $N \cdot e^{-3}$ | $N \cdot e^{-3}$ | L3 |
| H4 | $N \cdot e^{-4}$ | $N \cdot e^{-4}$ | $N \cdot e^{-4}$ | $N \cdot e^{-4}$ | L4 |

For $NO_x$, HC and CO the range L1 may be approximated as shown in Table 5:

TABLE 5

Approximated Low Data Range For $NO_x$, HC and CO

| Low | $L1 < 0.37\ N$ |
|---|---|

For $CO_2$ the range HI may be approximated as shown in Table 6:

TABLE 6

Approximated High Data Range for $CO_2$

| High | $2.7\ N < H1$ |
|---|---|

Pre-evaluation Analyzer

The Pre-evaluation Analyzer consists of two components, a test data presorter and a pattern generator. The test data presorter takes the 240 concentration data readings for each gas of the vehicle being tested, and creates a smaller concentration level subset. The smaller concentration level subset is created, because an analysis of all 240 of the concentration data readings for each of the four gases being analyzed are not required to determine the reason a vehicle fails the IM240 emissions test. In addition, reduction of the amount of data that needs to be processed improves testing speed and results reliability. For the purpose of analysis, failure diagnosis is determined by monitoring the fluctuations of the gases rather than the constant steady state flow. For example, data is collected for variations that occur in the readings for a gas record when the states of the car's engine go from hard acceleration to medium cruise or light acceleration to hard acceleration. The analysis of these fluctuations results in the requirement that only a subset of the entire data set need to be examined. This Reduces the size of the test data, significantly improving the performance of the system while reducing system complexity.

It is important to determine the correct sub-set size, since this sub-set data is imperative in determining the failure analysis. Accordingly, it is likely that the subset size may increase or decrease as failure predictions become more apparent through constant processing and use of stored information.

The Pre-evaluation Analyzer Pattern Generator captures the concentration level subset generated by the test data presorter and performs an analysis on the data for the purpose of creating failure patterns. A failure pattern generally refers to a bitmap pattern, unless specified otherwise. The Pattern Generator maps each concentration level subset of test data into a meaningful failure pattern so that the validity of the information is consistently maintained throughout the application. The concentration level subset of test data resulting from the pattern Generator consists of four bit map patterns, one for each of the four gases, namely, CO, HC, $NO_x$, and $CO_2$. Each of these bitmap patterns represents parametric characteristics of the varying gas concentration readings resulting from the IM240 test. An analysis is performed on each of the bitmap patterns to determine how each bitmap pattern maps up with a predetermined failure pattern for the same gas of the same class engine.

Although a failure can occur due to different reasons, the present invention monitors the abnormalities for single gas readings independently, so that insight into what causes some of the engine malfunctions can be more accurately pinpointed, the bitmap pattern set size can be reduced, and the probability of a match can be improved.

It should also be understood that correlating these gases are critical in identifying some of the other causes of failure. In addition, associated with each parameter abnormality, there will be a cause and reason for a failure.

Bitmap patterns are created for each of the 4 gas subsets based on how the concentration levels of the subset data points compare to the concentration levels of a predetermined normative data record for a properly functioning engine of the same class and gas type that has been subjected to the same testing conditions. In the preferred embodiment, the gas concentration levels of these records can fall within seven possible ranges: "Low," "Nominal," "Slightly High," "Moderately High," "Very High," or "Extremely High" for $NO_x$, HC and CO and "High," "Nominal," "Slightly Low," "Moderately Low," "Very Low," or "Extremely Low" for $CO_2$. However, it is to be understood that modifications can be made and that a reduction or increase in these range limits is also within the scope of the invention. The breakpoints of all the ranges for the gas reading will be based on the type of gas and the engine class. These breakpoints are stored along with the gas normative characteristics. Since each gas record will have six different range limits, each record reading will map to 3 bits padded to an even 4 bit boundary in the bitmap. However, it is understood that modifications in bit encoding can be made and that changes in length of bit encoding are also within the scope of the invention. Table 7 shown below shows an example of this mapping, as represented by a sub-set of IM240 test data:

TABLE 7

| Example CO Concentration Value |
| --- |
| . . . . . . . . . . . . . . . . . . . . . . . CO . . . . . . . . . . . . . . . . . . . . . . . |
| 300 |
| . . . |
| . . . |

If 300 was a moderately high CO value, the bitmap representation would be as shown in Table 8 below:

TABLE 8

| Example Bitmap Representation of CO Concentrations |
| --- |
| 1    0    0    0 |

The concentration levels for the bitmap representation as shown in Table 9 below, consists of:

TABLE 9

| Concentration Level for Bitmap Representation | | | |
| --- | --- | --- | --- |
| $NO_x$ HC CO | | $CO_2$ | |
| Low | | High | 0001 |
| Nominal | | Nominal | 0010 |
| Slightly high | | Slightly low | 0100 |
| Moderately high | | Moderately low | 1000 |
| Very high | | Very low | 1001 |
| Extremely high | | Extremely low | 1010 |

Therefore, the bit pattern for each data packet will contain 'n' bits, where, n is the number of sample points times 4. For example, if the total sample points (or the sub-set) were 50, then the total number of bits would be 200 for each of the four gases.

Pattern Match Analyzer

To the extent possible, all pre-determined failure patterns for each gas are defined and stored in memory. Associated with each failure summary pattern is a pattern identification that uniquely identifies that pattern. The pattern identifications are used to distinguish bitmap patterns that appear to be the same when they are in fact different. These identical bitmap patterns are not the same because they represent data from a different gas type or engine class. The pattern identifications relating to the individual bitmap patterns are assigned arbitrarily and the specific identification assignments have no impact on the search techniques used. In addition numerous patterns for a gas may have the same pattern identification when the variations between them are so slight as to be insignificant from a diagnostic point of view. A consistent numbering scheme is needed so that the Cause/Reason Analyzer can readily handle input from the gas pattern matches, correlation pattern matches, or the Inference Engine theoretical opinion. In the preferred embodiment, the first character (or digit) of the pattern identification is used to identify the type of the identification (0 for an inference engine theoretical opinion, 1 for $NO_x$ pattern identification, 2 for HC pattern identification, 3 for CO pattern identification, 4 for $CO_2$ pattern identification and 5 for a correlation pattern identification. The pattern identifications are linked together when necessary to create a correlation identification. There is also a flag associated with the individual gas pattern identifications indicating whether experience has shown that the result is final ("f") or intermediate ("i").

If any flag for one of the four gases indicates an intermediate ("i") result, the four pattern identifications are concatenated to form a correlation pattern which is passed to the Correlation Pattern Analyzer. If all four gases find patterns that have final ("f") flags, but the pattern identifications indicate differing diagnoses, a correlation pattern will also be formed and passed to the correlation pattern analyzer. If any one of the four gases resulted in a "not found" condition, a correlation pattern is formed, using a special "Not Found" pattern identification to fill in the missing gas pattern identification and passed to the correlation pattern analyzer.

The system can fail to find a pattern match for the generated bitmap pattern only when the bitmap pattern is missing. A bitmap pattern would be missing because that particular bitmap pattern was not generated and stored in the database as one of the possible patterns. A missing bitmap pattern can be either failure or non-failure patterns. A bitmap pattern is not a failure pattern when it has good and normal gas readings that fall within the acceptable threshold range. This situation arises when the engine malfunction does not affect that particular gas type. The system stores both failure and non-failure bitmap patterns in the database to enhance system speed and accuracy in pinpointing what caused the engine malfunction, because engine failures do not always affect all four gases.

Correlation Pattern Analyzer

Correlation comparison utilizes the tested vehicle's single gas pattern identifications. The figure below shows how a correlation pattern is computed. Assume, that the bitmap patterns matched for each of the gases, as shown below in Table 10:

TABLE 10

| Correlation Pattern Computation | |
|---|---|
| $NO_x$ High on Hard Acceleration | 1039 |
| HC Low on Low Cruise | 2012 |
| CO Very High on Medium Cruise | 3020 |
| $CO_2$ Very Low on Hard Deceleration | 4051 |

Then, the correlation pattern would be as shown below in Table 11:

TABLE 11

| Example Correlation Pattern | | | |
|---|---|---|---|
| 39 | 12 | 20 | 51 |

The Correlation Pattern Analyzer compares the generated correlation pattern against its correlation table to find a match. The correlation table, stored in the correlation failure signature store 139 (shown in FIG. 7) represents predefined portions in the same sense that the individual gas patterns are predefined. The correlation pattern identification retrieved is passed to the Cause/Reason Analyzer.

In the event that no correlation match is found, the Inference Engine is invoked to provide a theoretical answer.

Inference Engine

The Inference Engine shown in FIGS. 8 and 9c serves two purposes in the Diagnostic Engine: 1) it provides a theoretical solution when a pattern match is not successful, and 2) it provides Cause/Reason Analysis to bring the emissions diagnosis down to the component level.

The inference engine is used when the pattern match analyzer fails to find a solution. As shown in FIG. 9c, when prompted, the Inference Engine receives raw IM240 test data and some normative data representing breakpoints of the gases being tested. The Inference Engine Gas Elevation Analyzer then analyzes the raw test data 207, and creates a solution index 209 to be used with a predefined array of theoretical solutions for diagnosing the problem. If the diagnoses produced provides sufficient detail, no additional processing will be needed 211. The inference engine bypasses all other processing and performs a cause reason analysis to diagnose the problem 213, ending the analysis 215. If supplemental processing is needed 217, it is performed 219 to generate supplemental diagnoses that are submitted for cause reason analysis 213, for determining final diagnosis.

Data flows through the inference engine as shown in FIG. 8. After the Inference Engine is prompted, the raw IM240 test data 141, normative gas 143 and the break points 147 of the gases being tested are received. This data is analyzed by the Inference Engine's Gas Elevation Analyzer 145 by dividing the IM240 driving cycle into phases. The test data is compared to break points and the results are tallied by accumulators (not shown). The divided test data is then forwarded 149 to the Solution Index Generator 151, where decision trees 153 are used to create a solution index 155 which is used to determine the diagnosis. For some of diagnoses produced, more detail is desired. In this case, the solution record is forwarded to the Supplemental Processor 157 for further analysis to generate more pinpointed Failure Signature Codes 161. The rule set 159 used in performing the supplemental processing is shown in FIGS. 14a–14h. The Failure Signature Codes 161 generated are forwarded to the cause/reason analyzer which uses the Cause/Reason tables (not shown) and engine package data 167 to analyze the diagnoses 171 to the problem and find a final diagnosis 169. Failure Signature may also be gas pattern identifications from the pattern match analyzer or correlation pattern identifications from the correlation pattern analyzer 165.

Gas Elevation Analyzer & Solution Index Generator

The theoretical solution comes into play in those cases where, for whatever reason, the Pattern Match Module fails to find a solution. Conversely, the inference engine can not fail to find a solution. For any valid set of test data analyzed by the inference engine, a solution is guaranteed to be generated, although it may be of a less detailed nature than the Pattern Match Module would produce.

The inputs to the inference engine are the IM240 raw gas data for $NO_x$, HC, and CO ($CO_2$ is not used by this process), and the break points between high and normal for each of the three gases across the 240 seconds from the norms for the current engine package. Generic norms for the E.P.A. vehicle class may be used in cases where the norms for a particular VIN are not available. This most likely is the case when new vehicle models are introduced.

Output is the same type of diagnosis produced by the Pattern Match Module. In this case the solutions are of a theoretical nature, therefore the probabilities associated with them are of a theoretical rather than a statistical nature and the confidence numbers correspond to the theoretical nature of the answers.

The Inference Engine functions by reducing the gas data to a number between 0 and 647. This number is used as an index into an array of 648 predefined theoretical solutions. The numbers are derived by performing the following steps:

Step 1: Divide the IM240 Driving Cycle into four phases. These phases are Idle, Cruise, Acceleration, and Deceleration. Table 12 shows these divisions.

TABLE 12

| IM240 Driving Cycle Phases | | | |
|---|---|---|---|
| Phase | Seconds | Phase | Seconds |
| Idle: | 1–4 | Cruise: | 55–82 |
|  | 93–97 |  | 107–112 |
|  | 239–240 |  | 141–157 |

TABLE 12-continued

IM240 Driving Cycle Phases

| Phase | Seconds | Phase | Seconds |
|---|---|---|---|
| | | | 171–175 |
| | | | 188–102 |
| | | | 207–218 |
| Accel: | 5–15 | Decel: | 17–23 |
| | 25–31 | | 35–38 |
| | 40–54 | | 83–92 |
| | 98–106 | | 114–119 |
| | 120–125 | | 127–132 |
| | 136–140 | | 203–206 |
| | 158–170 | | 219–238 |
| | 176–187 | | |

Figure 12A:
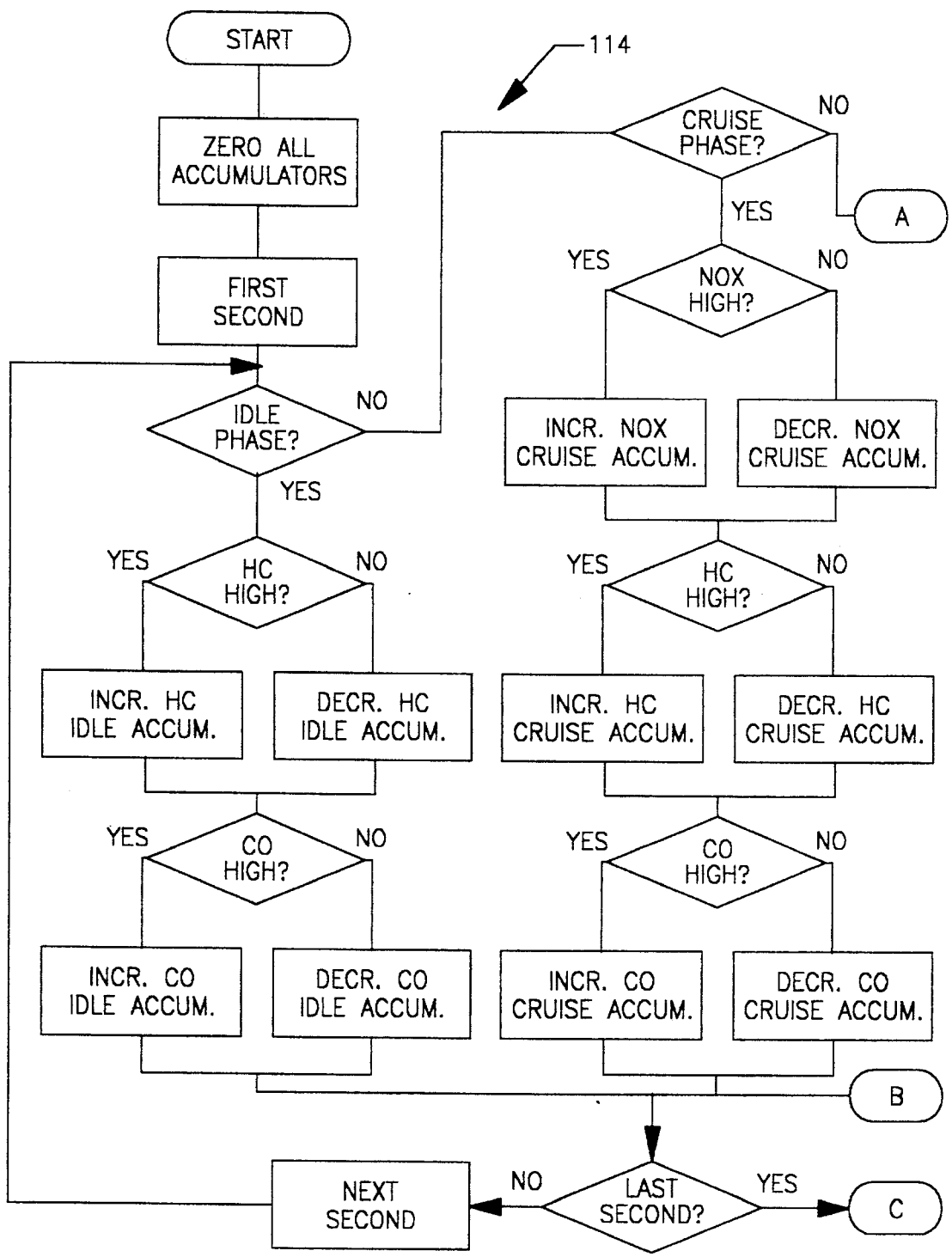
FIGS. 12a–12c illustrate first level inference engine data processing.
Figure 12B:
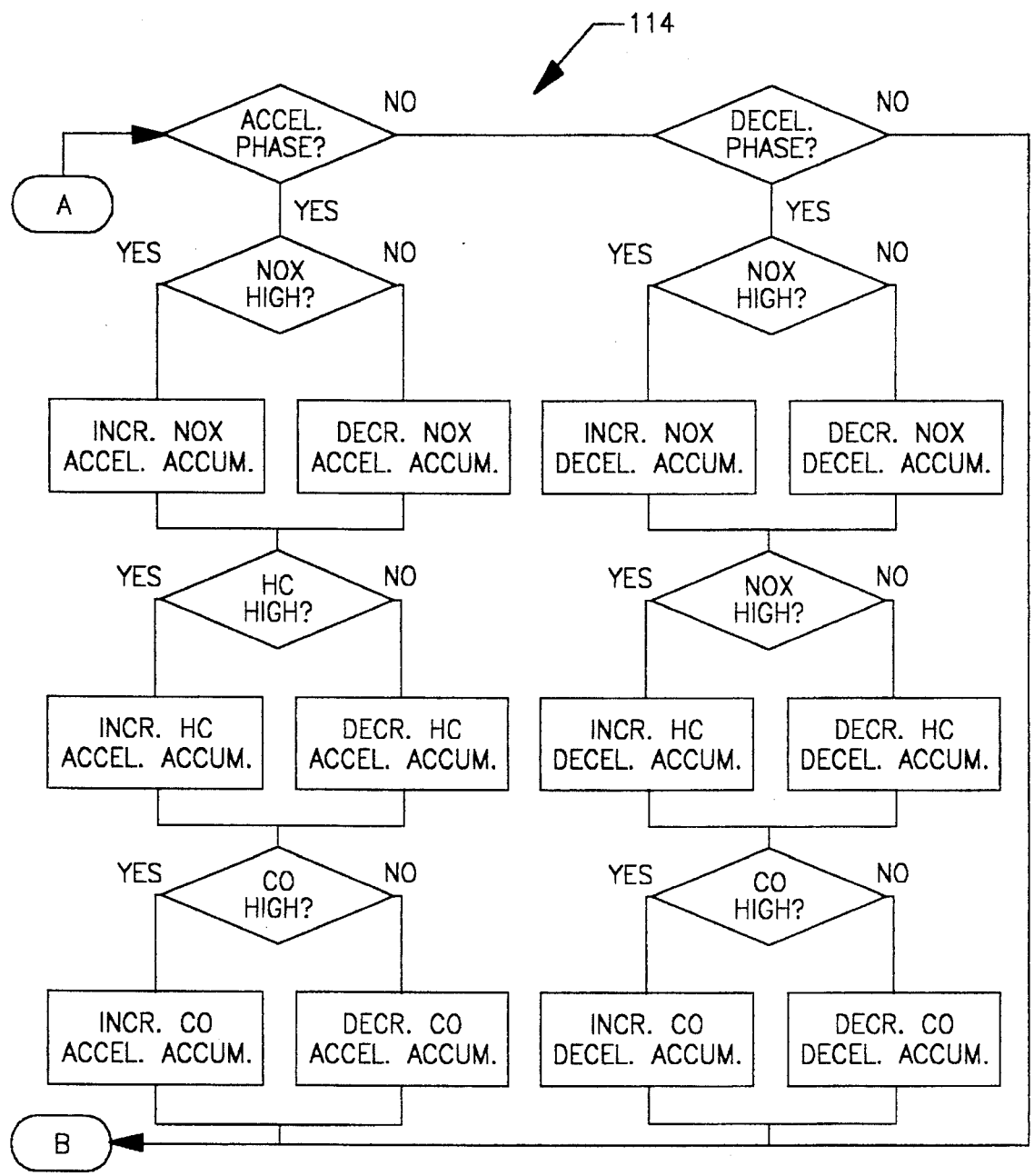
Figure 12C:
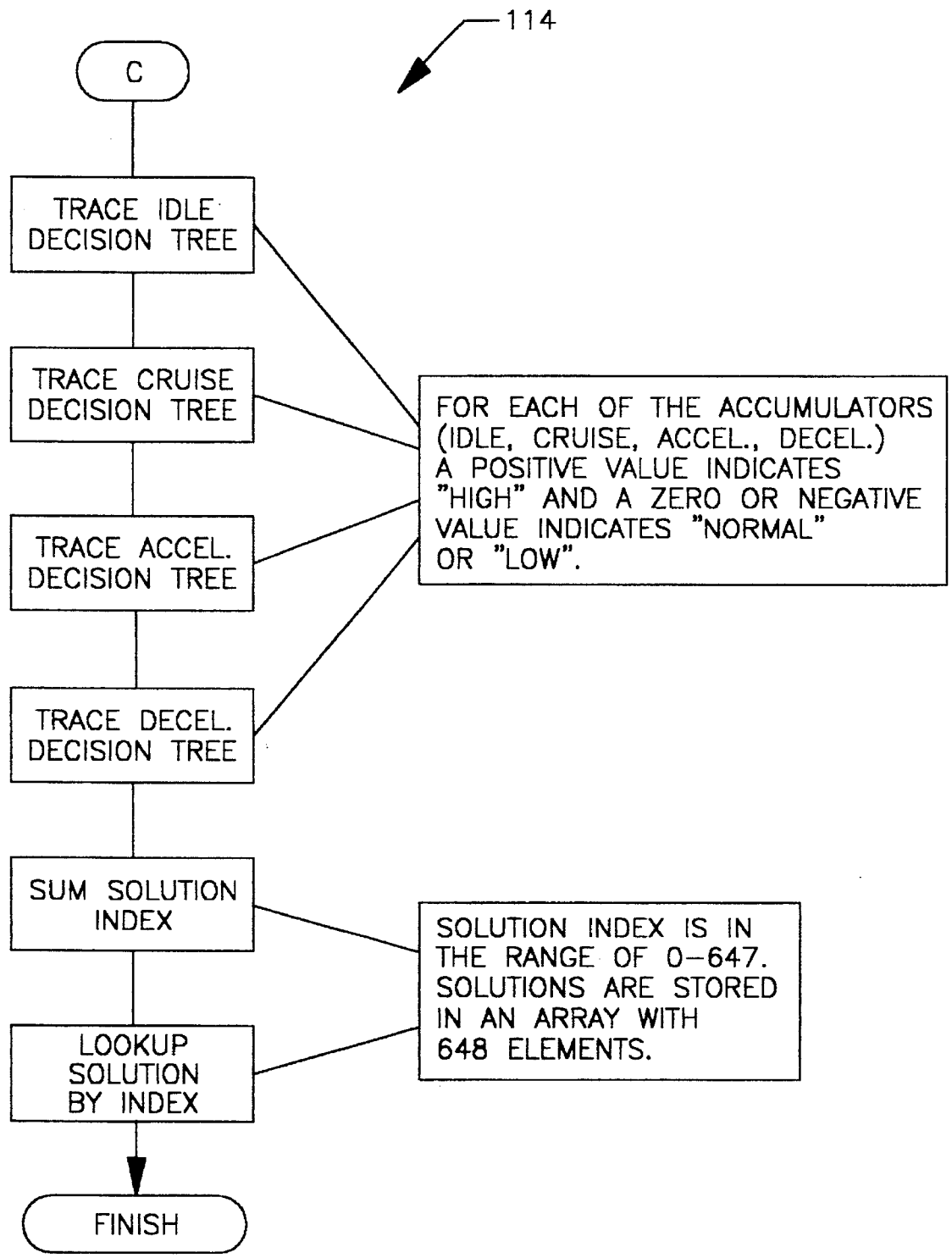

Step 2: Determine whether the median value for each of the three gases is higher than the break-point values for each of the four phases in the driving cycle. It does not matter whether the data is in grams per mile or concentration as long as the break points and test data use the same units of measure. This can be done quickly by using 14 accumulators and incrementing or decrementing them depending on whether the test data is greater than or less than the break points. Only 14 accumulators are needed because $NO_x$ is not used in the idle phase calculations. This process is illustrated in the Flow Chart 114 in FIGS. 12a–12c.

Figure 13B:
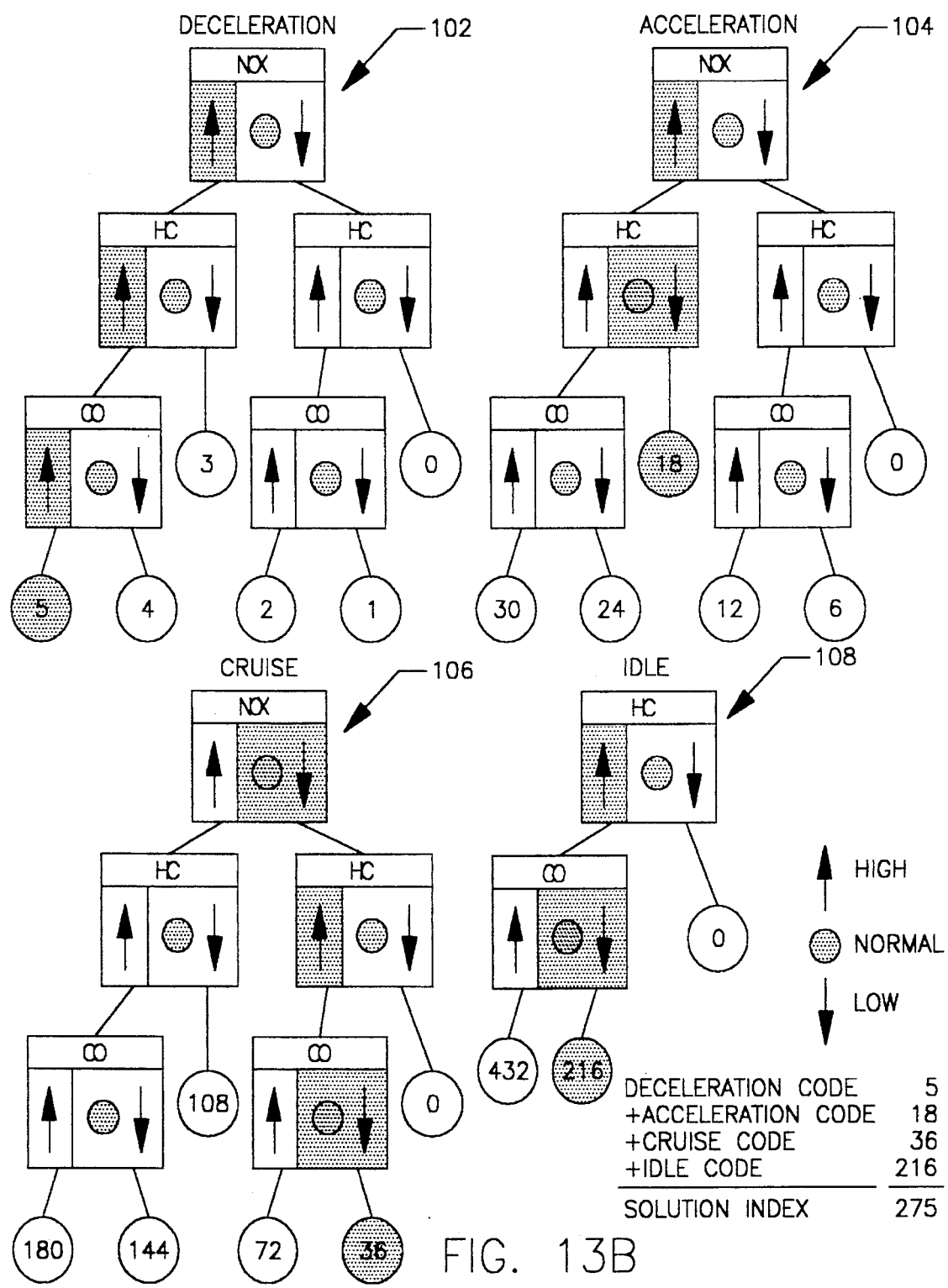
FIG. 13b is an example illustrating example numbers resulting from decision tree processing of the inference engine of the present invention.
Figure 14A:
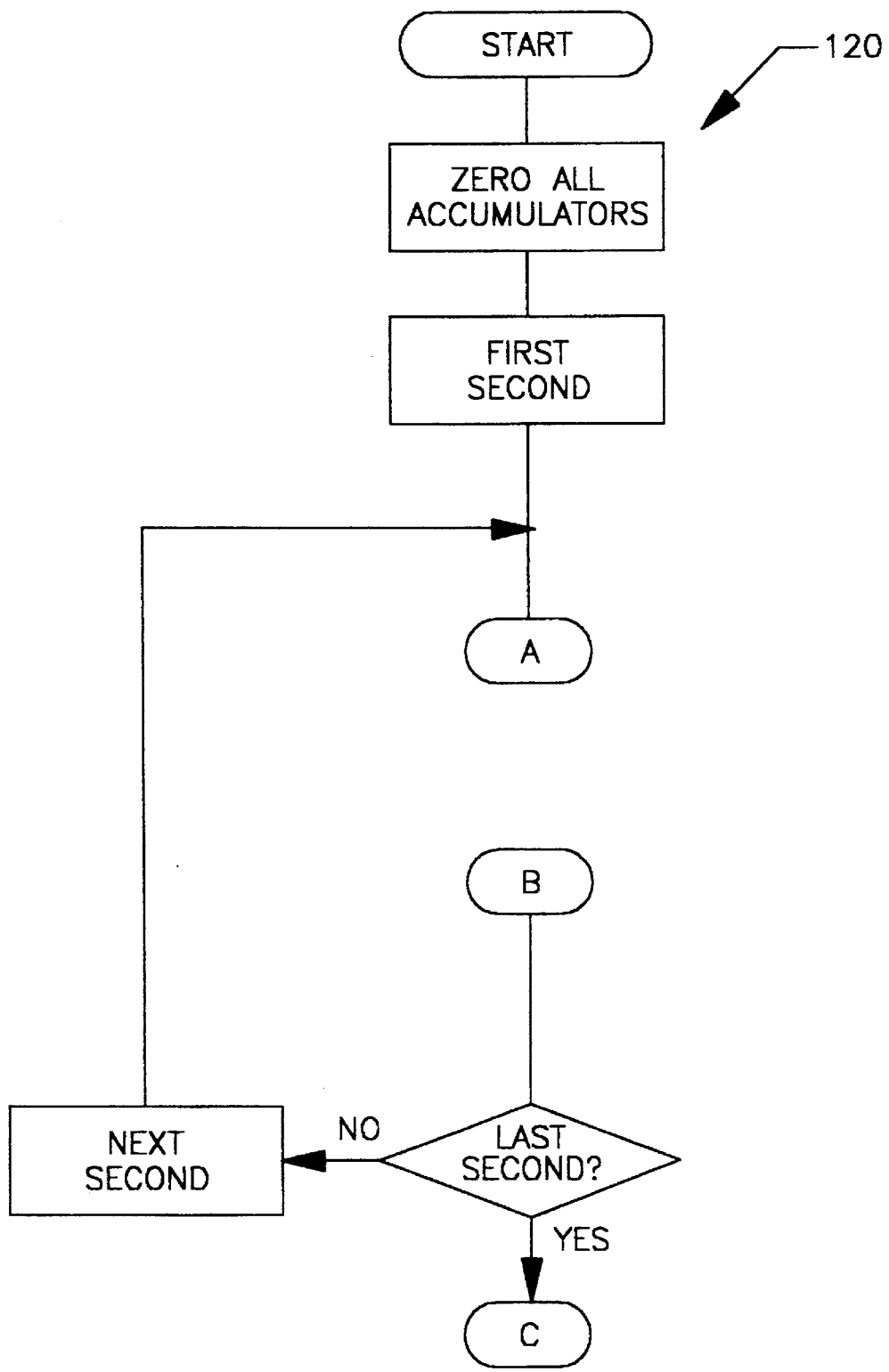
Figure 14B:
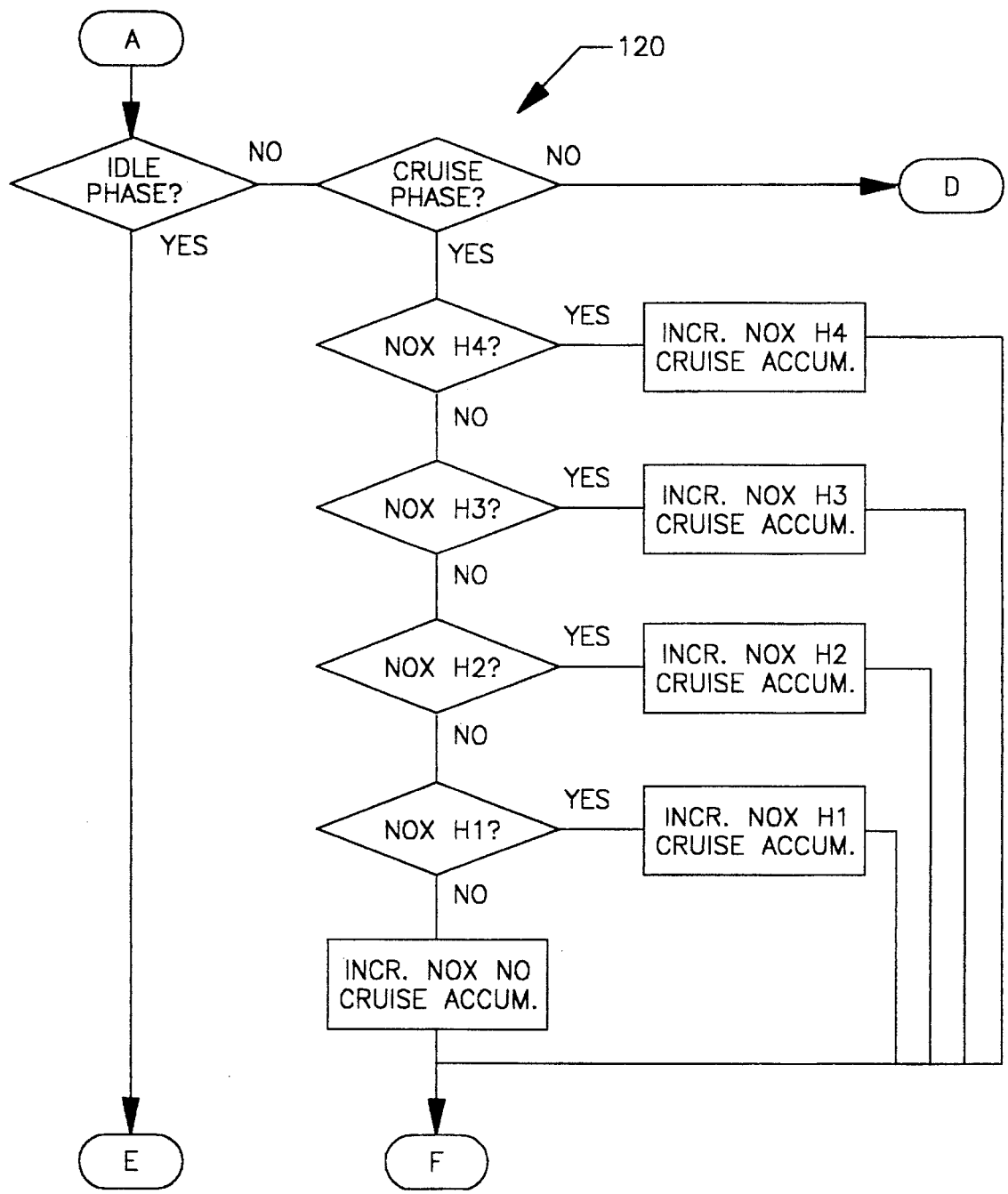

Step 3: Use the Accumulators to trace through four decision trees 102, 104, 106, and 108 for the four phases of the driving cycle. In each case a positive value in an accumulator indicates that the gas readings were high, a zero or negative value indicates that the gas readings were normal or low. The leaf nodes on each of the trees 102, 104, 106, and 108 contain code numbers for each phase of the driving cycle. By adding the four code numbers together, the final solution index is reached. An example of this process 118 is shown in FIG. 13b.

Step 4: Use the solution index to find the diagnosis in the array of 648 predefined theoretical solutions. This list of solutions is defined by theoretical automotive knowledge.

For some of the diagnoses produced by the Inference Engine, more detail may be desirable. In this case a flag may be set in the solutions array to indicate further processing needs to be done. The solution record would also contain a procedure identifier (pointer) to indicate which procedure needs to be executed.

To support this extended processing, a set of supplemental gas elevations indicators needs to be accumulated. This represents a set of 11 values; four each for $NO_x$ (except idle), HC, and CO during the four phases of the driving cycle. The value of the variable for each gas/phase combination represents the mode of the gas readings broken into the N0 (Low to Nominal), H1 (Slightly High), H2 (Moderately High), H3 (Very High), and H4 (Extremely High) categories. The use of these values is at the discretion of the procedure called.

The algorithm 120 for calculating the supplemental indicators is shown in FIGS. 14a–14h. First a count is accumulated for the number of times each gas falls into each range during each phase of the driving cycle. This requires 55 integer accumulators (not 60, $NO_x$ is not used at idle).

The next step is to find the mode of the counts for each gas/phase combination (or upper mode in the case of multimodel distributions). Starting with the H4 count, compare each count with the count for the next lower range. If the upper range count is less than or equal to the lower range count, move down to the next range. If the upper range count is greater than the lower range count, the upper range is the mode. After the mode for the counts are determined they are used by the supplemental processor, applying them against its rule set. Some example rules might be as shown in Table 13 below:

TABLE 13

Example of Supplemental Processors Use of Modes

| If | Idle HC mode is H4 | Then | solution 675 |
|---|---|---|---|
| If | Idle HC mode is H3 | Then | solution 676 |
| If | Idle HC mode is H3 | Then | solution 676 |

From this, Failure Signature Codes are generated for use in the Cause Reason Analyzer to determine diagnoses.

Cause/Reason Analyzer

The Cause/Reason Analyzer of the Inference Engine uses the Cause/Reason tables as shown below to retrieve the diagnostic text produced by the diagnosis process. Since there can be multiple analysis or diagnosis associated with a single failure signature, a sequence number is introduced to distinguish them. Failure Signatures may be gas pattern identifications from the Pattern Match Analyzer, or Correlation pattern identifications from the Correlation Pattern Analyzer, or a theoretical opinion identification from the Inference Engine.

Cause tracking is used to locate the text characterizing the state of the emissions gases and represents the 'cause' of the vehicle failing the test.

An example of Cause Tracking Records are shown below in Table 14:

TABLE 14

Example Cause Tracking Records

| Pattern ID | Sequence # | Diagnosis |
|---|---|---|
| 732 | 1 | $NO_x$ is high during deceleration. |
| 1073 | 1 | HC is slightly high at cruise. |

Reason tracking is used to locate the text characterizing the specific failed components on the vehicle that are the 'reason' the vehicle failed the test. For any one pattern identification there is one Reason record for each component of the vehicle which may have caused the failure. Since any one pattern may be representative of the same failure on many different vehicles with many different engine control packages, Reason records must be included for all of the possible components on all the different engine categories which may produce this pattern. The Engine Package record stored as part of the Norms, includes a list of all the different components to be found on that engine. The Cause/Reason Analyzer uses the Engine Package record to determine which of the possible Reason records should be accepted or rejected matching the components on the engine being diagnosed.

An example of Reason Tracking Records is shown below in Table 15:

TABLE 15

Example Reason Tracking Records

| Pattern ID | Sequence # | Component | Diagnosis | Probability | Confidence |
|---|---|---|---|---|---|
| 329 | 1 | 10 (EGR Valve) | stuck open | 0.8 | 0.7 |
| 329 | 2 | 5 (Air Filter) | clogged or dirty | 0.9 | 0.5 |
| 329 | 3 | 12 (MAP Sensor) | lazy response time | 0.75 | 0.8 |

The Cause/Reason tables also contain the Probability and Confidence attributes. The probability may either be theoretical or statistical. Statistical probability will however, have a higher confidence level than a theoretical.

Where space is limited on a diagnostic report form, the diagnostic reason records may be sorted in descending order by the product of probability and confidence. This facilitates printing the best answers first before reaching the space cutoff point. It also assists the shop mechanic in prioritizing his diagnostic and repair process.

Closed Loop Learning

A key component of this system is that it is, in fact, a closed loop system. Over time the actual repairs made to vehicles causes the diagnoses to become more intelligent. To produce this effect a feed back mechanism is put into place so that repair mechanics report back to the state EPA what repairs were actually performed on the vehicles. In FIG. 3, failed vehicle are sent out for repair 2. The mechanic fills out a repair report detailing what was replaced and/or adjusted on the vehicle. When the vehicle is re-tested 1 and passes, the data from both passed and failed tests is sent to a research data base 3. The data from the passed and failed tests can then be compared to determine the efficacy of the repair 4. The data from passed tests is used to update the norms (including breakpoints) for each engine category 5. Engine VINs are scanned to find missing entries in the VIN tables. Gas data is processed to find missing entries in the pattern tables. Repairs are matched to patterns to generate pattern identification cause/reason relationships. The relative frequency of a repair along with its efficacy in returning emissions to normal are used in generating probabilities and sample sizes will affect the statistical confidence numbers. Further analysis will indicate which sample points are the best predictors for various failures resulting in a change of the pre-sort set definitions. In addition, it may become evident that changes in the decision trees, rule sets, or actual software code is needed. The result is that under a revision control system, a new generation of the diagnostic engine and its data tables is created and deployed in the field. Each succeeding generation becomes more intelligent in its diagnoses.

Thus, there has been described, a computer implemented system for analyzing and diagnosing vehicle emission testing data having the ability to track, process and store problems associated with engines and what repairs were performed to eliminate engine malfunction.

What is claimed:

1. A computer implemented method for providing a diagnosis for automotive engine malfunctions using collected vehicle emissions data, comprising the steps of:

(a) generating a concentration level subset for each individual gas of a group of gases within said vehicle emissions data collected forming a plurality of concentration level subsets;

(b) comparing each of said concentration level subsets with predetermined normative concentration break point value data sets to determine relative correspondence between each of said concentration level subsets and said predetermined normative concentration break point values;

(c) generating relative correspondence data patterns representative of said relative correspondence between each of said concentration level subsets and said predetermined normative concentration break point values; and (d) comparing said relative correspondence data patterns with a plurality of predetermined relative correspondence data patterns for finding a match, wherein each said predetermined relative correspondence data patterns are each associated with a failure signature code, whereby said failure signature code is used to diagnose said engine malfunctions.

2. A computer implemented method for providing a diagnosis to automotive engine malfunctions comprising the following steps:

(a) determining automatically an engine type for a vehicle being tested;

(b) searching a computer database for predetermined normative gas characteristics associated with said engine type;

(c) loading said predetermined normative gas characteristics into a memory location in the computer, said predetermined normative gas characteristics including failure patterns, normative concentration break point values, causes and reasons for abnormal gas concentrations and correlation information;

(d) generating vehicle emissions for use in determining the engine malfunction, said vehicle emissions being generated by operating said engine at varying loads, said loads defined by emission testing standards;

(e) collecting said vehicle emissions for use in generating a concentration level subset for each individual gas of a group of gases within said vehicle emissions collected;

(f) comparing each said concentration level subset with said concentration break point values of said predetermined normative characteristics to determine a relative correspondence between each said concentration level subset and said normative concentration break point values, said relative correspondence being represented as a bitmap pattern;

(g) comparing said bitmap pattern of said relative correspondence against a plurality of predetermined relative correspondence bitmap patterns for determining an engine condition associated with each gas, wherein each of said predetermined relative correspondence bitmap patterns is associated with a failure signature code for use in diagnosing said engine malfunction; and (h) diagnosing said engine malfunction using said failure signature codes.

3. The computer implemented method of claim 2 including the step of:

(a) updating said plurality of predetermined relative correspondence bitmap patterns to include said bitmap patterns of said relative correspondence when a match for said bitmap patterns of said relative correspondence is not within said plurality of predetermined relative correspondence bitmap patterns.

4. The computer implemented method of claim 2 wherein said failure signature codes used in diagnosing said engine malfunction are keys into causes within a cause information table and reasons within a reason information table, said cause information table having descriptive information about said gas behaviors, said reason information table containing a matrix of associated engine malfunctions, said cause information table being updated with information received for repairs preformed.

5. The computer implemented method of claim 2 wherein said group of gases including NOx, CO2, CO, and HC.

6. The computer implemented method of claim 2 wherein said method further includes performing a correlation comparison analysis on said emissions testing data when one of said relative correspondence bitmap patterns is not identically matched with one of said predetermined relative correspondence bitmap patterns, said correlation comparison analysis including the following steps:

(a) concatenating said failure signature codes associated with each of said predetermined relative correspondence bitmap patterns causing a testing data correlation pattern to be generated;

(b) comparing each said testing data correlation pattern against a plurality of predetermined correlation patterns for locating an identical pattern match, wherein each of said predetermined correlation patterns is associated with a correlation failure signature code for use in diagnosing said engine malfunction; and (c) diagnosing said engine malfunction using said correlation failure signature code.

7. The computer implemented method of claim 2 wherein said method further analyzes said emissions testing data by performing a correlation comparison analysis including the following steps:

(a) concatenating said failure signature associated with each said predetermined failure bitmap pattern causing a testing data correlation pattern to be generated;

(b) comparing each said testing data correlation pattern against a plurality of predetermined correlation patterns for locating an identical pattern match, wherein each of said predetermined correlation patterns is associated with a correlation failure signature code for use in diagnosing said engine malfunction; and (c) diagnosing said engine malfunction using said correlation failure signature code.

8. The computer implemented method of claim 2 wherein said method further includes performing an inference engine analysis on said emissions testing data when more than one of said emission concentration level bitmap patterns is not identically matched with one of said predetermined failure bitmap patterns, said inference engine analysis including the following steps:

(a) receiving said raw emissions testing data and said break point values of said predetermined normative gas characteristics for use in creating a solution index value;

(b) creating a solution index value;

(c) comparing said solution index value to a rule set table, said rule set table having an array of solution values, wherein one of said solution values matches said solution index value, wherein a theoretical solution is associated with each said solution value; and (d) diagnosing said engine malfunction using said theoretical solution.

9. The computer implemented method of claim 2 wherein said method further includes performing an inference engine analysis on said emissions testing data when a correlation comparison analysis does not determine a cause and reason for said engine malfunction, said inference engine analysis including the following steps:

(a) receiving said vehicle emissions collected and said normative concentration break point values of said predetermined normative gas characteristics for use in creating a solution index value;

(b) generating a solution index value;

(c) comparing said solution index value to a rule set table, said rule set table having an array of solution values, wherein one of said solution values matches said solution index value, wherein a theoretical pattern identification is associated with each said solution value; and (d) diagnosing said engine malfunction using said theoretical pattern identification.

10. The method of claim 9 wherein said inference engine analysis includes performing supplemental processing to generate said theoretical pattern identification for use in diagnosing said engine malfunction when said solution value identified indicates that supplemental processing needs to be performed.

11. A computer implemented method of refining diagnosis provided to a vehicle owner for automotive engine malfunctions detected during an emissions test comprising the following steps:

(a) repeating the emissions test following repair of the engine malfunction for determining whether retested engine emissions collected are within an acceptable concentration range;

(b) comparing a first test engine emissions and said retested engine emissions for determining the efficiency of said repair performed; and (c) updating a database within the computer with said repair performed, when said repair performed is different from the diagnosis provided and said retested engine emissions collected are more normative than said first test engine emissions, for replacing the diagnosis provided and generating a new diagnosis for association with the engine malfunction.

12. A computer implemented system for diagnosing automotive engine malfunctions using collected vehicle emissions data, comprising:

(a) a means for generating a concentration level subset for each individual gas of a group of gases within said vehicle emissions data collected forming a plurality of concentration level subsets;

(b) a means for comparing each of said concentration level subsets with predetermined normative concentration break point values to determine a relative correspondence between each of said concentration level subsets and said normative concentration break point values; and (c) a means for comparing said relative correspondence with a plurality of predetermined relative correspondence data readings for finding a match, wherein each said predetermined relative correspondence data reading is associated with a failure signature code, whereby said failure signature code is used to diagnose said engine malfunctions.

13. A computer implemented system for diagnosing automotive engine malfunctions comprising:

(a) a means for automatically determining an engine type for a vehicle being tested;

(b) a means for searching a computer database for predetermined normative gas characteristics associated with said engine type;

(c) a means for loading said predetermined normative gas characteristics into a memory location in the computer, said predetermined normative gas characteristics including failure patterns, normative concentration break point values, causes and reasons for abnormal gas concentrations and correlation information;

(d) a means for generating vehicle emissions for use in determining the engine malfunction, said vehicle emissions being generated by operating said engine at varying loads, said loads defined by emission testing standards;

(e) a means for collecting said vehicle emissions for use in generating a concentration level subset for each individual gas of a group of gases within said vehicle emissions collected;

(f) a means for comparing each said concentration level subset with said concentration break point values of said predetermined normative characteristics to determine a relative correspondence between each said concentration level subset and said normative concentration break point values, said relative correspondence being represented as a bitmap pattern;

(g) a means for comparing said bitmap pattern of said relative correspondence against a plurality of predetermined relative correspondence bitmap patterns for determining an engine condition associated with each gas, wherein each of said plurality of predetermined relative correspondence bitmap patterns is associated with a failure signature code for use in diagnosing said engine malfunction; and (h) a means for diagnosing said engine malfunction using said failure signature codes.

14. The computer implemented system of claim 13 including:

(a) a means for updating said plurality of predetermined relative correspondence bitmap patterns to include said bitmap patterns of said relative correspondence when a match for said bitmap patterns of said relative correspondence is not within said plurality of predetermined relative correspondence bitmap patterns.

15. The computer implemented system of claim 13 wherein said failure signature codes used in diagnosing said engine malfunction are keys into causes and reasons within cause and reason information tables, said cause information table having descriptive information about said gas behaviors, said reason information table containing a matrix of associated engine malfunctions, said cause table being updated with information received for repairs performed.

* * * * *

UNITED STATES PATENT AND TRADEMARK OFFICE
CERTIFICATE OF CORRECTION

PATENT NO. : 5,572,424

DATED : November 5, 1996

INVENTOR(S) : Kellogg et al.

It is certified that error appears in the above-indentified patent and that said Letters Patent is hereby corrected as shown below:

In column 17, Table 12, line 6, "188-102" should read --188-202--.

Signed and Sealed this

Eleventh Day of November, 1997

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,572,424

DATED : November 5, 1996

INVENTOR(S) : Kellogg et al.

It is certified that error appears in the above-identified patent and that said Letters Patent is hereby corrected as shown below:

In column 4, line 4, "14a-14h" should read --14a,14b,14C.1-14C.4,14D.1-14D.2,14E.1-14E.4,14F.1-14F.4,14G.1-14G.4 and 14H.1-14H.3--.

In column 16, line 18, "14a-14h" should read --14a,14b,14C.1-14C.4,14D.1-14D.2,14E.1-14E.4,14F.1-14F.4,14G.1-14G.4 and 14H.1-14H.3--.

In column 17, line 57, "14a-14h" should read --14a,14b,14C.1-14C.4,14D.1-14D.2,14E.1-14E.4,14F.1-14F.4,14G.1-14G.4 and 14H.1-14H.3--.

Signed and Sealed this

Thirteenth Day of January, 1998

Attest:

Attesting Officer

BRUCE LEHMAN

Commissioner of Patents and Trademarks